United States Patent
Hirtzel et al.

(10) Patent No.: US 11,158,350 B2
(45) Date of Patent: Oct. 26, 2021

(54) SYSTEMS AND METHODS FOR PROTOCOL FOR ANIMATED READ ALONG TEXT

(71) Applicant: Vooks, Inc., Portland, OR (US)

(72) Inventors: Russell Powell Hirtzel, Portland, OR (US); Marshall Bex, IV, Portland, OR (US)

(73) Assignee: Vooks, Inc., Portland, OR (US)

( * ) Notice: Subject to any disclaimer, the term of this patent is extended or adjusted under 35 U.S.C. 154(b) by 0 days.

(21) Appl. No.: 17/100,736

(22) Filed: Nov. 20, 2020

(65) Prior Publication Data
US 2021/0158778 A1    May 27, 2021

Related U.S. Application Data

(60) Provisional application No. 62/938,891, filed on Nov. 21, 2019.

(51) Int. Cl.
*G11B 27/10*    (2006.01)
*G06F 40/10*    (2020.01)
(Continued)

(52) U.S. Cl.
CPC ............ *G11B 27/10* (2013.01); *G06F 40/103* (2020.01); *G06T 13/80* (2013.01); *G09G 5/02* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,121,874 B1 * | 2/2012 | Guheen | G06Q 10/087 705/7.11 |
| 8,635,531 B2 * | 1/2014 | Graham | G06F 16/40 715/716 |

(Continued)

FOREIGN PATENT DOCUMENTS

| | | |
|---|---|---|
| EP | 1205898 | 5/2002 |
| WO | WO0021057 | 4/2000 |

OTHER PUBLICATIONS

Anonymous [online], "CEA-708," Wikipedia reference, Nov. 3, 2014, retrieved on Mar. 11, 2016, retrieved from URL <https://en.wikipedia.org/w/index.php?title=CEA-708&oldid=632318087>, 14 pages.

(Continued)

*Primary Examiner* — Wesner Sajous
(74) *Attorney, Agent, or Firm* — Fish & Richardson P.C.

(57) ABSTRACT

A system and method for displaying emphasized text are described. A line of text having multiple words is displayed successively emphasized at the pace of human speech. Each of the words is displayed in a first state. The emphasized word is then displayed in a second state as having an outline. Next, the emphasized word is displayed in a third state as heavier-weighted text. Finally, the emphasized word is displayed in a fourth state as regular text. The words are visually emphasized one at a time such that a first word is displayed in the third state when a second word is displayed in the second state and the first word is displayed from the third state to the fourth state when the second word is displayed from the second state to the third state and a third word is displayed in the second state.

20 Claims, 13 Drawing Sheets

(51) Int. Cl.
  *G06T 13/80* (2011.01)
  *G09G 5/02* (2006.01)
  *G09G 5/30* (2006.01)
  *H04N 21/43* (2011.01)
  *H04N 21/84* (2011.01)
  *H04N 21/65* (2011.01)
  *G06F 40/103* (2020.01)
  *H04N 21/431* (2011.01)
  *H04N 21/435* (2011.01)
  *H04N 21/488* (2011.01)
  *H04N 21/6587* (2011.01)
  *H04N 21/845* (2011.01)

(52) U.S. Cl.
  CPC ............. *G09G 5/30* (2013.01); *H04N 21/435* (2013.01); *H04N 21/4312* (2013.01); *H04N 21/4884* (2013.01); *H04N 21/6587* (2013.01); *H04N 21/8456* (2013.01); *G06T 2200/24* (2013.01); *G09G 2354/00* (2013.01)

(56) References Cited

U.S. PATENT DOCUMENTS

| | | |
|---|---|---|
| 2004/0175095 A1 | 9/2004 | Freeman |
| 2012/0181347 A1* | 7/2012 | Scherer ................. B05B 7/1263 239/8 |
| 2017/0302900 A1 | 10/2017 | Besnard et al. |
| 2018/0033329 A1 | 8/2018 | Suleiman |
| 2019/0196675 A1 | 6/2019 | German |
| 2021/0158844 A1 | 5/2021 | Hirtzel et al. |
| 2021/0160583 A1 | 5/2021 | Hirtzel et al. |

OTHER PUBLICATIONS

Anonymous [online], "MacCaption and CaptionMaker 6.0: Video Captioning for any Mac/PC Digital Workflow—Quick Start Guide," Telestream, Oct. 2013, retrieved on Jun. 9, 2015, retrieved from URL <http://web.archive.org/web/20140713012423/https://www.telestream.net/pdfs/quick-starts/MacCaption-and-CaptionMaker-Quickstart.pdf>, 66 pages.

PCT International Search Report and Written Opinion issued in International Application No. PCT/US2020/061651 dated Mar. 12, 2021, 12 pages.

PCT International Search Report and Written Opinion issued in International Application No. PCT/US2020/061658 dated Mar. 12, 2021, 13 pages.

PCT International Search Report and Written Opinion issued in International Application No. PCT/US2020/061662 dated Mar. 12, 2021, 15 pages.

\* cited by examiner

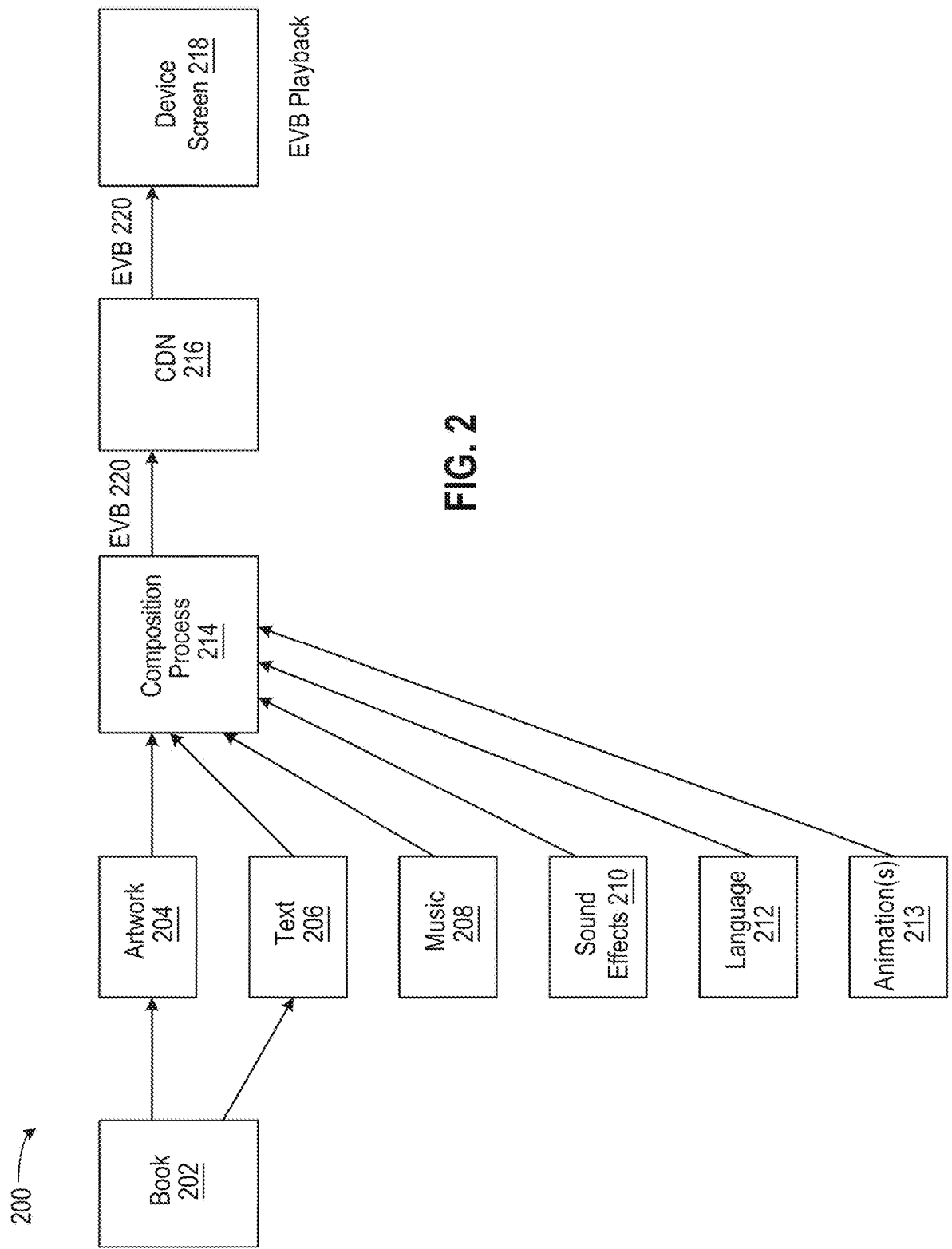

FIG. 3A  State 1   a giraffe gone quackers

FIG. 3B  State 2   a giraffe gone quackers

FIG. 3C  State 3   a giraffe gone quackers

FIG. 3D  State 4   a giraffe gone quackers

FIG. 3E  State 5   a giraffe gone quackers

SYSTEMS AND METHODS FOR PROTOCOL FOR ANIMATED READ ALONG TEXT

CROSS REFERENCE TO RELATED APPLICATION

This application claims the benefit of priority to U.S. Provisional Application 62/938,891, "Enhanced Video Books," filed Nov. 21, 2019. The entire contents of U.S. Provisional Application 62/938,891, "Enhanced Video Books," are hereby incorporated into this document by reference.

COPYRIGHT STATEMENT

A portion of the disclosure of this patent document contains material that is subject to copyright protection. The copyright owner has no objection to the facsimile reproduction by any individual or collective of the patent document or the patent disclosure as it appears in the Patent and Trademark Office patent file or records, but otherwise reserves all copyright rights whatsoever.

TECHNICAL FIELD

This disclosure relates to video books, for example, enhanced video books for children.

BACKGROUND OF THE DISCLOSURE

Books are a form of visual media and communication containing text. Books can contain graphics corresponding to the text. People of all ages can read books. Some books, for example, a children's story book, are formed with text and images that can make reading a fun and enjoyable experience. Some books can be formed on paper with ink. In paper and ink books, the text and graphics are static on the pages of the book. A reader, such as a child reading a story book, would merely read the text and look at the graphics in the book. The child reader may read the book with help from a parent or other caregiver by visually scanning the text and graphics on a page and then manually turning to the next page to view the text and graphics therein. The reader can visually scan the text and graphics on a page, initially learning this style by using the reader's finger to follow along with the text and graphics. Another form of books can be electronic books (e-books). E-books can replicate the reading experience that a reader has with paper and ink books. In some cases, a child who reads either a paper and ink book or an e-book can lose interest, become distracted, or otherwise not finish reading the book.

SUMMARY

This disclosure relates to systems and methods for an enhanced video book, a protocol for animated read along text, and enhanced closed captioning commands. Implementations of the present disclosure include a method for displaying emphasized text. The method includes displaying a line of text having multiple words, then successively visually emphasizing each of the words at a pace of human speech, one at a time, successively, through a first state, a second state, a third state, and a fourth state. Each of the words is visually emphasized one at a time such that a first word of the words is displayed in the third state when a second word of the words is displayed in the second state and the first word of the words is displayed from the third state to the fourth state when the second word of the words is displayed from the second state to the third state and a third word of the words is displayed in the second state.

Each of the words in the line of text is displayed in a first state. The first state can correspond to a degree of opacity that is less than 100 percent. Each of the emphasized words is then displayed an emphasized word from the first state to a second state successive to the first state. The emphasized word is displayed in the second state as having an outline. Displaying the emphasized word from the first state to the second state can includes incrementally increasing the degree of opacity. The outline displayed in the second state can be a color variant that is different from a color of the emphasized word.

The method includes displaying the emphasized word from the second state to a third state successive to the second state. The emphasized word is displayed in the third state as heavier-weighted text. Displaying the emphasized word from the second state to the third state can include incrementally increasing the degree of opacity.

The method includes displaying the emphasized word from the third state to a fourth state successive to the third state. The emphasized word is displayed in the fourth state as regular text. Displaying the emphasized word from the third state to the fourth state can include increasing the degree of opacity to 100 percent.

In some implementations, each of the words can be successively visually emphasized at a pace that mimics a number of syllables in each of the words. The pace of human speech can be based on at least one of an age group of readers, a reader skill level, and a number of words in the multiple words. Each of the words can be successively visually emphasized at a pace that is set by a reader at a user device. Each of the words can be successively visually emphasized at a pace corresponding to a rate at which a user's eye moves across a screen of a user device. The screen displays the line of text having the words Each of the words can be successively visually emphasized at a pace corresponding to a speed at which a user reads the line of text having the words.

In some implementations, the method can include displaying a second line of text having a second set of words. Each of the second set of words in the second line of text is displayed in the first state, then successively visually emphasizing each of the second set of words and displaying each of the second set of words in the second state, the third state, and the fourth state.

In some implementations, the method can include successively visually emphasizing each letter of each of the words. Each letter of each of the words is displayed in the second state, the third state, and the fourth state.

In some implementations, each of the words can be successively visually emphasized as each of the words are dictated with voice-over narration.

Further implementations of the present disclosure include a system for displaying emphasized text. The system includes a first device and a second device.

The first device has a graphical user interface (GUI) display. A user provides user input to the GUI display. The first device, based on the user input, displays a line of text having words. Each of the words in the line of text is displayed in a first state. The first device, based on the user input, generates a second state successive to the first state, a third state successive to the second state, and a fourth state successive to the third state for displaying each of the words in the line of text at a pace of human speech. The second state includes an outline, the third state includes heavier-weighted text, and the fourth state includes normal text.

The second device has a GUI display. The second device receives, from the first device, the line of text having the words. The second device successively visually emphasize each of the words at the pace of human speech. Emphasizing each of the words includes displaying the emphasized word from the first state to the second state. The emphasized word is displayed as having the outline. Emphasizing each of the words also includes displaying the emphasized word from the second state to the third state. The emphasized word is displayed as heavier-weighted text. Finally, emphasizing each of the words displaying the emphasized word from the third state to the fourth state. The emphasized word is displayed as regular text.

In some implementations, the first device can, based on the user input, change a color of each of the words from at least one of the first state to the second state, the second state to the third state, and the third state to the fourth state. The second device can further configured to display each of the words in the color from at least one of the first state to the second state, the second state to the third state, and the third state to the fourth state.

In some implementations, the first device can, based on the user input, change a font of each of the words from at least one of the first state to the second state, the second state to the third state, and the third state to the fourth state. The second device can further display each of the words in the font from at least one of the first state to the second state, the second state to the third state, and the third state to the fourth state.

In some implementations, the first device can, based on the user input, change an emphasis of each of the words from at least one of the first state to the second state, the second state to the third state, and the third state to the fourth state. The second device can display each of the words in the emphasis from at least one of the first state to the second state, the second state to the third state, and the third state to the fourth state. The emphasis can be at least one of bolding, underlining, shading, and cross-hatching.

In some implementations, the first device can, based on the user input, change an emphasis of each letter of each word of the words from at least one of the first state to the second state, the second state to the third state, and the third state to the fourth state. The second device can display each letter of each word of the words in the emphasis from at least one of the first state to the second state, the second state to the third state, and the third state to the fourth state. The emphasis can be at least one of a size of each letter increasing then subsequently decreasing, a weight of each letter increasing then subsequently decreasing, a color of each letter brightening then subsequently darkening, changing a first color of each letter to a second color then subsequently reverting to the first color, and an outline of each letter appearing then subsequently disappearing.

Implementations of the present disclosure can have one or more of the following advantages. For example, readers can experience a book (e.g., material) in new and appealing ways that increase a number of sensory feeds. By stimulating different senses, reader interest in the book can increase. Increasing the number of sensory feeds by animating the book can capture and maintain a child's attention, which can be essential to the child's development and education. Game-ification of the book's storyline can be decreased, which can therefore increase engagement with the book. This is because fewer distractions may be presented to the reader. In other words, the disclosed systems and methods provide for engaging the reader with the book's storyline without distracting the reader by presenting the reader with interactive, or game-type, elements. The enhanced video books described herein can provide a liner experience to the reader, which is less distracting than e-books but more captivating than paper and ink books. For example, e-books may typically provide a variety of ways to change delivery of a story. This can frustrate the intent of finishing a book from start to end, especially for younger children who may not allow an e-book to finish. As a result, child readers may not get the intended benefits of reading storybooks in formats such as e-books.

As another example, reader comprehension of a storyline can be improved. Reader tunnel vision, such as zoning out, can be decreased. Enhanced video books as disclosed herein can assist younger children in finishing books, improving the reading experience, and improving a learning experience intended the author. Moreover, the disclosed systems and methods can convey an entire paper book experience without compromising or removing parts from the book's storyline. Other media formats, such as videos, short films, or e-books may typically adapt the book's storyline. As a result, these formats may not fully integrate text from the paper book, which diminishes the reader's ability to take away the intended reading experience.

Moreover, reader comprehension can be improved by implementing protocol for animated read-along text (e.g., PART), as described throughout this disclosure. Presenting linear text can improve reading comprehension for readers who have difficulty hearing. In some cases, these readers can prefer watching content of a book without audio so as not to disrupt other people who are nearby. The disclosed systems and methods can provide these readers with such functionality. Therefore, these readers can get the full reading experience.

PART, as described herein, can also assist readers to speed up and improve a process for learning how to read. Using linear text for educational purposes can help increase reading skills, such as reading faster. Hearing a word pronounced and seeing it being pronounced at the same time can help young or new readers to better understand pronunciation, meaning of words, different vocabulary, and grammar. This feature can also assist any type of reader in learning new languages. By animating test using PART, storylines can be more attractive to child readers, thereby securing their attention for a greater period of time and improving the overall learning experience.

Contextual reasoning can also be improved using PART and other systems and methods disclosed herein. This can especially be improved for readers who prefer adding a text feature to video books. The ability to see pictures, especially those having additional features such as animations and popups, can help the reader associate the text that is being read with visuals. The reader can develop a greater understanding of the storyline as well as general vocabulary.

The disclosed systems and methods can also make following along in a video book easier. Youth are taught to follow along in books via a finger, typically the index finger. This traditional method helps the reader keep track of where they are on the page of the book. However, in electronic and video books, using the index finger can become harder to do. Touchscreen devices can be too sensitive such that the reader may inadvertently zoom, turn a page, or accidentally click on an advertisement. This can be problematic for a young reader who is learning to read, a reader who is trying to strengthen reading skills, or a person who is viewing the book for pleasure or entertainment. Using the disclosed systems and methods can assist the reader in following along without distractions such as having to turn a page in a book or accidentally pressing something on a sensitive touchscreen interface. The disclosed systems and methods can animate text in real-time, word by word and/or letter by letter, which can increase a reader's awareness of where they are in relation to the audio or narration of the book. Therefore, the reader can follow along without having to use their finger or accidentally pressing something on a touchscreen.

Ways to experience a book's material and subject matter can be increased. The systems and methods described herein can provide for creating a fun and animated version of words that can be read, spoken, or listened to. As a result, the reader's focus and ability to pay attention to the storyline can be increased, thereby increasing learning ability and brain development of the reader. Early childhood development is essential for a person's long term cognitive and reasoning abilities, along with emotional intelligence. Keeping a child's attention can increase the growth that the child will encounter. Children enjoy fun activities more, so by increasing the fun of reading using the disclosed systems and methods, development of the child can also be increased. Reading is a cornerstone to proper early childhood development. The world can open up more to a child who is proficient in reading. Parents and guardians can then allow the child to seek content or learning material that they choose, which typically they find intriguing or fun. Using the disclosed systems and methods, books can become more intriguing and fun for child readers, which can stimulate the child readers to read more. The reading experience can be more fun because the disclosed systems and methods can implement visual sensors that project timely and animated read-along text with animated imagery, sound effects, music, and/or narration. A combination of such features can assist the reader to pick their own pace to read the book without assistance from other people or other media formats. Moreover, a reader's position on a page can be determined using sensing capabilities to then adjust a timing, speed, or pace for presenting the reader with animated read-along text. As a result, the reader's attention can be maintained, the learning experience can be improved, and the reader can find the reading experience fun and intriguing.

Additionally, readers having a reduced ability to see clearly or neurological disabilities can more easily follow animated read-along text. For example, if some brain paths are underdeveloped, some sensory pathways can be hindered or functionally reduced. In some of these cases, animated text can improve the brain's ability to track along with the material. Therefore, the disclosed systems and methods can assist such readers in being able to read while also improving or developing sensory abilities of their brains. Finally, for readers who have vison clarity issues, the disclosed systems and methods provide for using different colors, animation, strokes, bolding, highlighting, and other features to assist the reader in visualizing, identifying, and following text as it is being narrated.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

FIG. 2 illustrates an example of a process for generating and displaying the enhanced video book of FIGS. 1A-1C.

FIGS. 3A-3E illustrate an example of a protocol for animated read-along text for the enhanced video book of FIGS. 1A-1C.

Like reference numbers and designations in the various drawings indicate like elements.

DETAILED DESCRIPTION

This disclosure relates to enhanced video books, for example, books delivered electronically for display on a user device such as a tablet computer, smartphone, laptop computer, or the like. Enhanced video books can animate each page in real-time in a seamless manner such that graphics, audio, and text may be generated in front of a user's eyes as the user views the book. The text can be emphasized as the user views the book to assist the user in following along as the text is being narrated. For example, a line of text having multiple words can be displayed and successively emphasized at a pace of human speech. As an example, each word in the line of text can be displayed in a first state. Then each word can be emphasized and displayed in a second state as having an outline. The emphasized word can then be displayed in a third state as heavier-weighted text. The emphasized word can also be displayed in a fourth state as regular text. The words can be visually emphasized one at a time such that a first word is displayed in the third state when a second word is displayed in the second state and the first word is displayed from the third state to the fourth state when the second word is displayed from the second state to the third state and a third word is displayed in the second state. As another example, the text can be displayed as enhanced closed captioning in a video. The video can have multiple frames and a user can define an appearance and a location of text to be displayed in each of the video frames. The appearance and the location of text can be synchronized with each of the frames of the video. A delivery packet can then be generated that includes a design packet, the video, a video timecode, a text timecode, and enhanced closed captioning commands. The delivery packet can be provided to a user device for seamless playback.

Figure 1A:
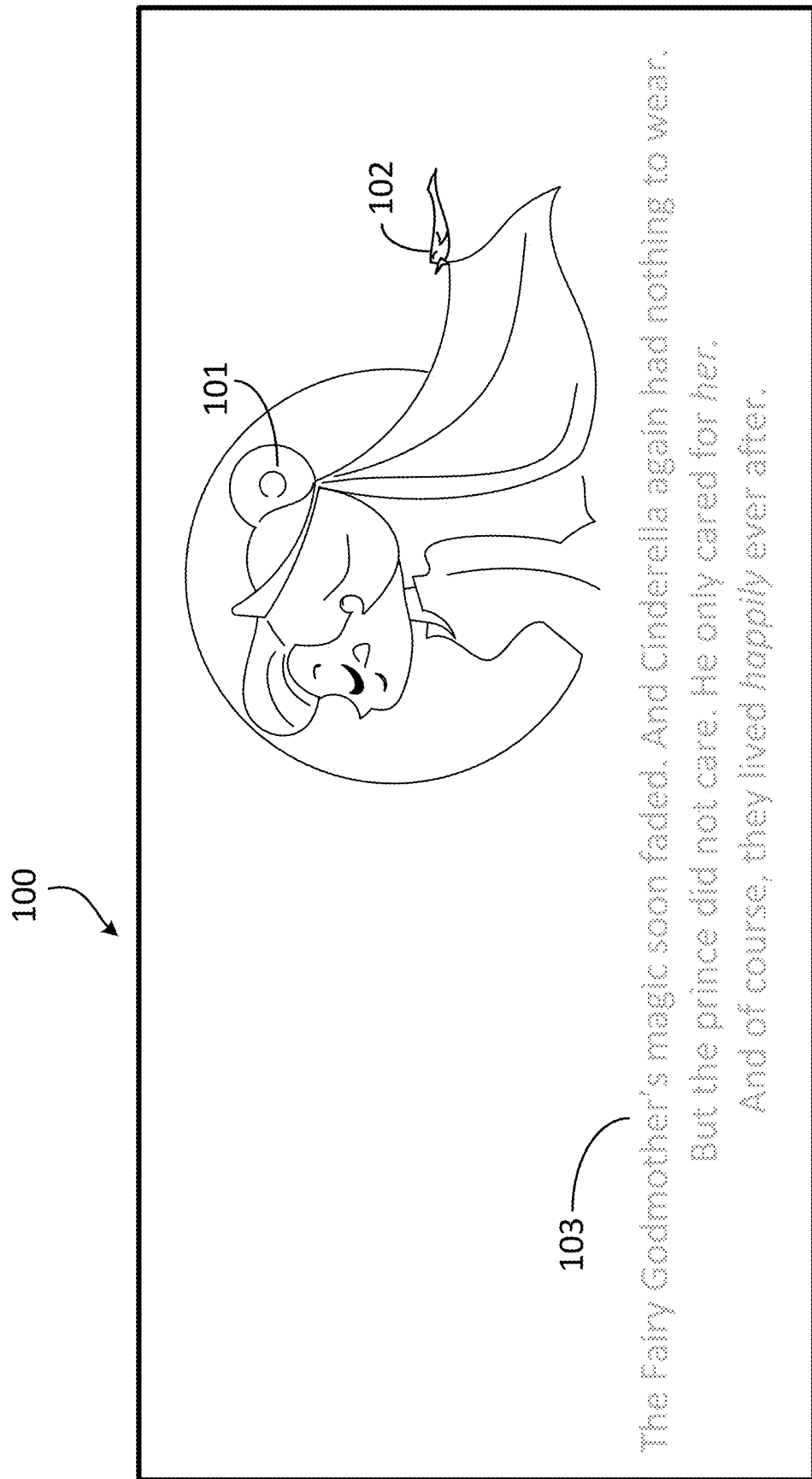
FIGS. 1A-1C illustrate an implementation of a manner in which an enhanced video book can be presented to a user.
Figure 1B:
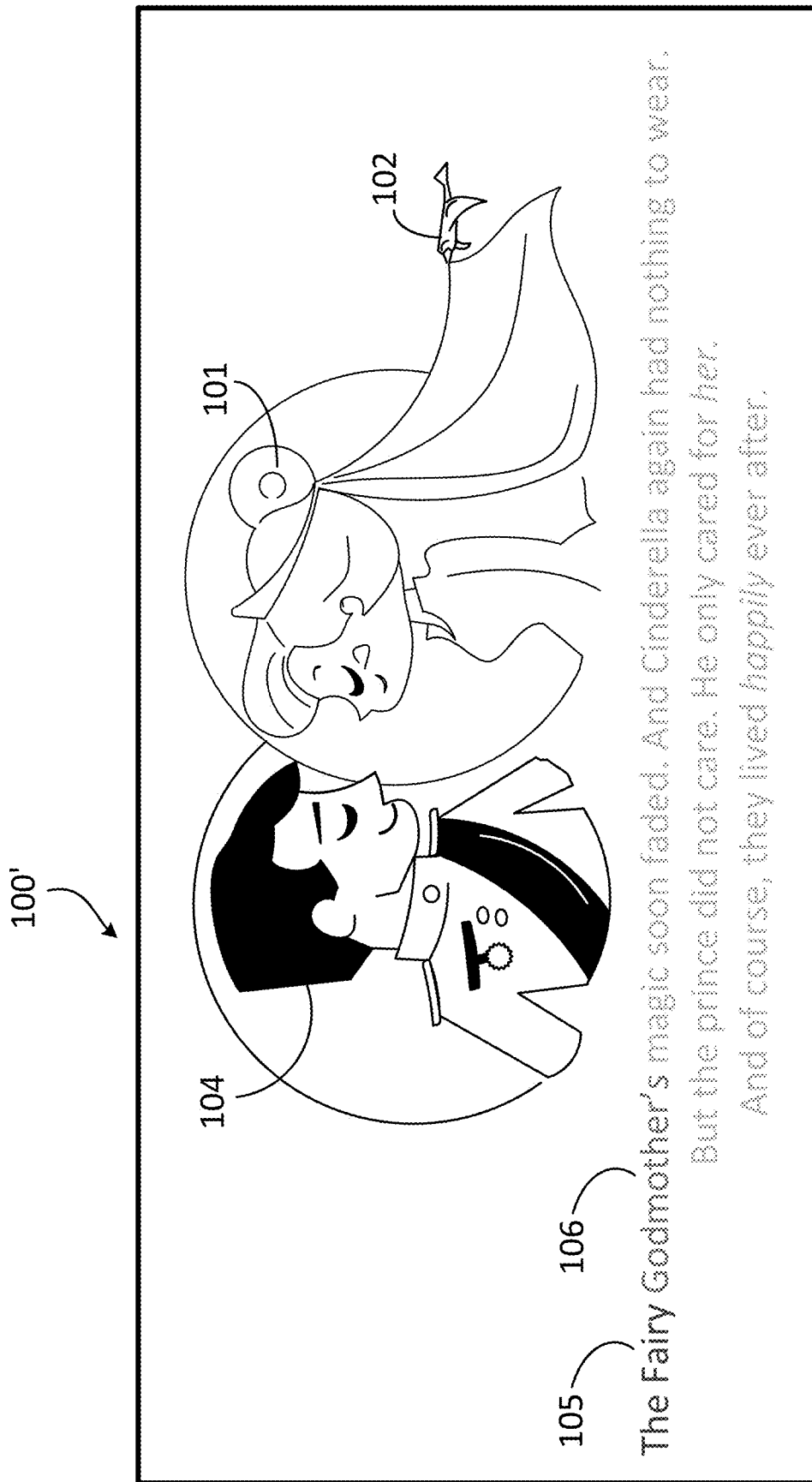
Figure 1C:
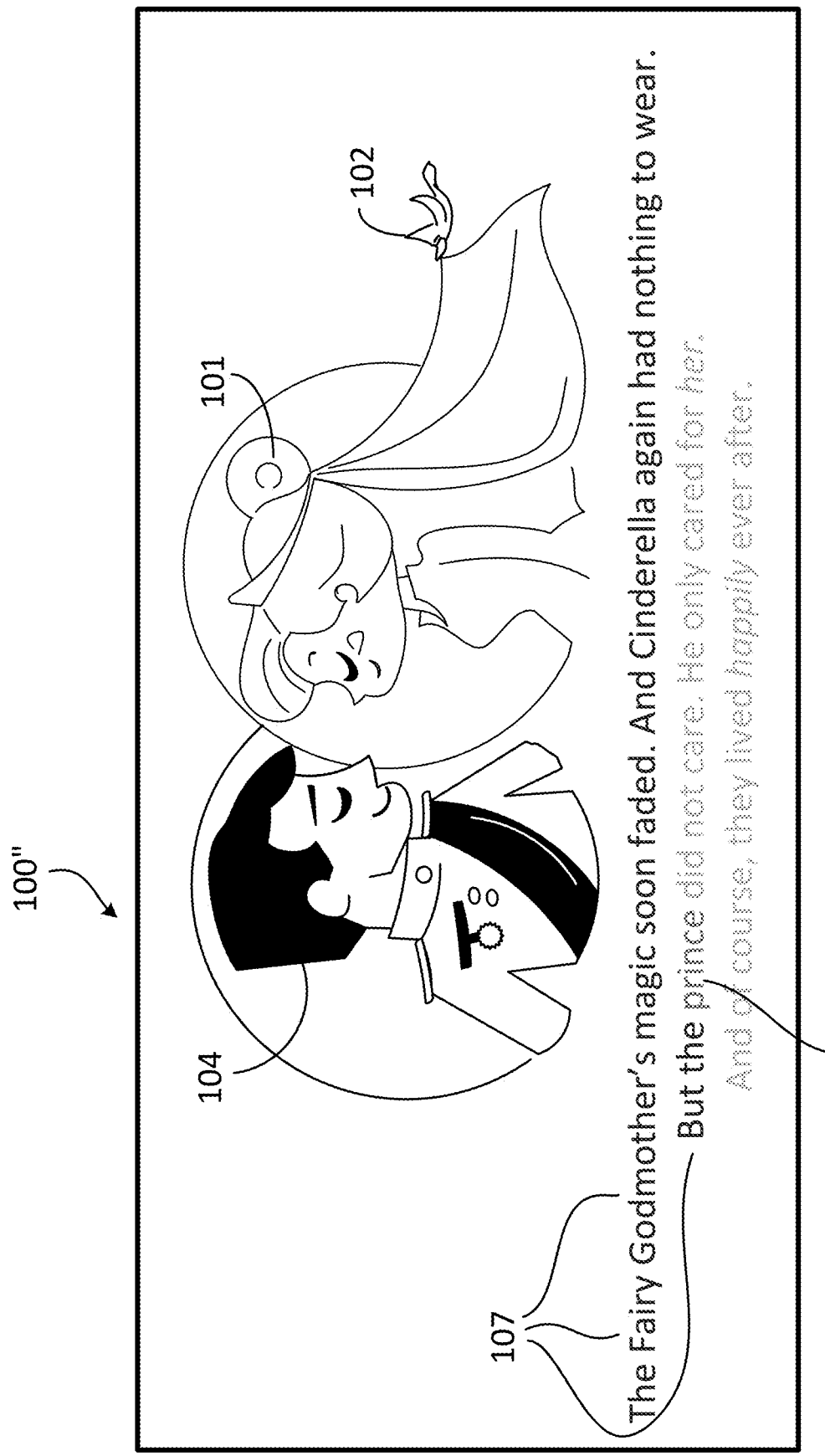

Referring to the figures, FIGS. 1A-1C illustrate an implementation of a manner in which an enhanced video book can be presented to a user. FIGS. 1A-1C depict three successive scenes to illustrate gradual animations that are seen by the user to provide a smooth and seamless reading experience. FIG. 1A is a scene 100 of a princess character 101 lightly moving via animation. The scene 100 also includes a bird 102 shown flapping its wings as it moves slightly up and down via animation. Semi-transparent text 103 appears on the screen 100. The semi-transparent text 103 corresponds to words that can be narrated by a voiceover narration.

FIG. 1B shows an updated scene 100' in which a prince character 104 is now added to the scene 101', also lightly moving via animation. The bird 102 has moved and continues flapping its wings. The princess 101, the prince 104, and the bird 102 represent original artwork from a storybook that are now set in motion with animation. As described throughout this disclosure, a developer can set the storybook into motion using one or more known software tools or applications. The developer can lightly animate the images 101, 104, and 102 to stimulate the reader and keep the reader's attention without distracting the reader from continuing to follow along with a storyline.

At this point in the scene 100', the narrated voiceover has begun, and has narrated the words "The Fairy" 105. The voiceover is just starting to narrate the word "Godmother's" 106. The narrated words ("The Fairy" 105) have transitioned from semi-transparent text, as in semi-transparent text 103 (shown in FIG. 1A), to now fully opaque text as shown in updated scene 100' "The Fairy" 105. The word in the process of being narrated, in this instance "Godmother's" 106, demonstrates the process of extra emphasis being added to the semi-transparent text 103, synchronized with the voiceover to emphasize each word as it is narrated or spoken. The voiceover narration and animated text can be paced to match a range of beats per minute as defined by elements, for example, such as the original storybook's characteristics, a targeted age demographic, and thematic elements. The developer can determine how to emphasize each word and synchronize such animations with the voiceover narration. For example, as described further below, the developer can choose to emphasize the words "The Fairy" 105 as semi-transparent text once the voiceover completes reading those words. This type of emphasis can cause the reader to follow the other words in the line of text as they are emphasized, thereby reducing distractions in the scene 100' and assisting the reader to continue reading and following along with the storyline.

Lastly, FIG. 1C shows a scene 100" in which the princess 101, the prince 104, and the bird 102 continue to move slightly with animation. In this example, the voiceover narration has continued and progressed through more of the semi-transparent text 103 (refer to FIG. 1A). At this point, the voiceover has narrated the text "The Fairy Godmother's magic soon faded. And Cinderella again had nothing to wear. But the" 107. The word "prince" 108 is currently in a process of being narrated, and therefore is being emphasized in another state of emphasis that is synchronized with the voiceover narration. In FIG. 1C, previously narrated text remains opaque after it is narrated (e.g., the text 107). In other implementations, the developer can choose one or more different states of emphasis to apply to each word, each letter, each phrase, and/or each syllable in the line of text. As a result, the developer can create an enhanced video book from an original storybook having unique, customized, and dynamic integration of animations, audio, sound effects, and other visualizations. The enhanced video book can assist the reader in maintaining their focus on reading and improving an overall learning experience.

FIG. 2 illustrates an example of a process 200 for generating and displaying an enhanced video book 220 of FIGS. 1A-1C. The enhanced video book 220 (e.g., EVB) can be a compilation of one or more different media formats and features. For example, the EVB 220 can be a digital, non-interactive, linear reproduction of a book 202. The book 202 can be a typical bound paper and ink book. In other implementations, the book 202 can be a typical electronic book (e.g., e-book). Text 206 and artwork 204 (and/or illustrations) of the book 202 can be extrapolated using known techniques and/or software application or tools. In some implementations, the book 202 (e.g., physical book) may not be used in the process 200. Instead, a user, such as an author or writer, can provide a storyline to a developer. The developer can then generate text 206 and artwork 204 for that storyline using the process 200. In other words, the developer can build original characters, images, scenes, and text around the storyline provided by the user, even if the user does not have the storyline in a physical book format (e.g., the book 202). In yet other implementations where the physical book 202 is not used in the process 200, the user can provide the developer with animated video as input for the EVB 220. The developer can then build a storyline, text 206, and/or narration for the received animated video using the process 200 and one or more other techniques described herein.

The text 206 and/or artwork 204 can be animated and/or set into motion by a developer in creating the EVB 220. A developer can add additional media and features to the text 206 and artwork 204 to further enhance or animate the EVB 220. For example, music 208, sound effects 210 (e.g., SFX), animation(s) 213 (e.g., the text 206 and/or the artwork 204 can be animated), and different language 212 can be added to the EVB 220. These features can be added to one or more parts of the EVB 220 in a composition process 214. The composition process 214 can be done by the developer using known techniques and/or software application or tools. For example, the developer can use a suite or package of animation software to bring together one or more features of the EVB 220.

Once the EVB 220 is generated in the compilation process 214, the EVB 220 can be packaged for delivery via a content delivery network 216 (e.g., CDN). The EVB 220 can be delivered to a device screen 218 for playback. The device screen 218 can be part of any suitable digital means, such as a mobile phone, smartphone, mobile application, laptop, computer, e-reader, digital broadcast, etc.

Enhanced video books 220 are digital, page-for-page, linear versions or reproductions of books with minimal interactivity, and are designed to be streamed like videos or games. The EVB 220 can be delivered in video format. The EVB 220 provides the reader with limited functionality as compared to an e-book. The reader of an EVB 220 can be limited to stop, play, rewind, skip, and select language (voice and copy) functions. Other than these functions, the enhanced video book 220 can be free of manual interactivity by the reader. As a result, the reader can be engaged in following a storyline of the EVB 220 without being distracted by too many interactive elements. The EVB 220 can be streamed and/or downloaded via the Internet or mobile applications, thereby making it easier for the reader to take the EVB 220 with them and read at any time that the reader desires. The pacing of the EVB 220 can be intentionally slower to mimic a parent reading to a child. This can be advantageous to assist the reader in learning how to read, learning how to pronounce words, and learning vocabulary.

The process 200 of conforming the original artwork 204 and the text 206 of the book 202 to create the EVB 220 can involve use of technical methods of animating and rendering one or more features of the EVB 220, as described herein. Input to the process 200 can be the conventional book 202, for example, a children's storybook or picture book having text and graphics (e.g., still images). From the book 202, the artwork 204 and text 206 can be extracted and converted to a digital format. A viewer of the EVB 220 can look back at the original book 202, from which the enhanced video book 220 is created, and see a direct parallel between both. In other words, all the artwork 204 and the text 206 from the book 202 are incorporated into the EVB 220. The developer does not adapt or remove content from the book 202, thereby ensuring that a storyline of the EVB 220 remains true to a storyline of the book 202. As a result, the viewer of the EVB 220 can get a full reading experience that an author of the book 202 intended. The composition process 214 of conforming the original artwork 204 to video specifications and standards can include use of one or more technical methods of animating and rendering out the EVB 220 for use in streaming or other linear video delivery methods and platforms.

Still referring to FIG. 2, the artwork 204 can be original artwork from the book 202. The original artwork 204 can include text and/or images that make up the book 202. The artwork 204 may be altered or amended as needed to account for 1) changes in formatting that may arise from formatting for video versus original formatting of the artwork 204, 2) changes resulting from animating the artwork 204, or setting it in motion, or changes necessitated by animation or motion that require altering or amending the original artwork 204 to accommodate for such animation or motion, and/or 3) changes resulting from a process of converting the original artwork 204 into a form to be animated or set in motion. For example, the original artwork 204 can be broken and flattened into layered pieces of the artwork 204. As a result, each of the layered pieces can be more easily and individually animated or set in motion by the developer. Any such changes can be made in a similar style or character of the original artwork 204 such that the EVB 220 parallels the original book 202.

As described above, in some implementations, the artwork 204 may not be from a physical book, such as the book 202. Instead, the artwork 204 can be created by the developer based on a storyline received from the user (e.g., author or writer). The artwork 204 can also be a video or animated images, rather than artwork from the physical book.

The developer of the enhanced video book 220 can generate additional digital content such as the music 208, sound effects 210, animations 213, and/or additional graphics. The developer of the enhanced video book 220 can also specify one or more languages 212 in which the text 204 of the enhanced video book 220 can be displayed and/or narrated.

As mentioned, the book 202's artwork 204 can contain text 206. The text 206 can be animated in a read-along fashion so as to mimic a process of reading. As an example, animating the text 206 can be accomplished by highlighting each word, one at a time, in synchronization with voiceover narration of the same text 206. The animated read-along text can follow one or more different formats of the developer's choosing. In some implementations, the animated read-along text can follow a format by which 1) semi-transparent text appears on screen and 2) voiceover begins narrating the same semi-transparent text while 3) the semi-transparent text is transformed word by word, in sync with the voiceover narration. As a result, the same word being spoken by the voiceover can be emphasized, thereby transitioning to a fully opaque state. This type of animated read-along text can be beneficial to assist the reader in learning how to read, following along, and maintaining focus or interest in a reading experience.

As mentioned, voiceover narration of the text 206 can also be included in a read-along fashion. The voiceover narration can be synchronized with animated read-along text. The voiceover narration can match in pacing, theme, and tonality of the original book 202, and can also be adjusted for the book's age demographic. Moreover, one or more voiceover narrations can be provided in different languages 212, such that the reader can learn a different language or read the book 202 in a language of the reader's preference (e.g., the book 202 can be written in English but the reader only knows Spanish, so the voiceover narration language 212 can be Spanish).

The animated artwork 204 and the text 206 can be paced. That is, the animated artwork 204 and the text 206 can be deliberately set to mimic a pace at which the book 202 would be read. Some variation in pacing can occur, depending on various factors such as 1) an age group the book 202 is meant for (e.g., variations between books intended for 2-4 year olds versus books intended for 6-8 year olds, etc.), 2) comprehension standards as a result of content or a storyline of the book 202, and/or 3) thematic elements within the book 202.

The music 208 can be synchronized to the artwork 204 to further enhance an experience of the reader viewing the enhanced video book 220. The music 208 created or added can be aligned with pacing, theme and tonality of the original book 202 and whatever additional features, such as animations, are added to the EVB 220. The music 208 can align to the book 202's age demographic, thematic elements within the book 202, and/or tonal elements. The music 208 can audibly represent the storyline or visuals of the original book 202. Adding the music 208 to one or more portions of the EVB 220 can make the reading experience more engaging and maintain the reader's interest and focus without being distracting.

One or more sound effects 210 can be synchronized to different elements of the EVB 220 to further enhance the experience of reading or viewing the EVB 220. The sound effects 210 can be used in a manner to work in concert with, and further add interest and life to, the animations 213, the artwork 204, and the text 206.

An overall timing of the enhanced video book 220 can be determined by one or more of factors mentioned above. Consideration can be given to words per minute, as relating to the voiceover narration 212, and beats per minute, as relating to the music 208. The pacing of the voiceover narration 212 and the music 208 can work in concert and may be determined by various factors, including an age demographic of the book 202, comprehension level of an intended audience, and thematic elements of the book 202.

The enhanced video book 220 can be linear video played at one or more different frame rates. The frame rate can be a certain number of frames per second, played in sequential order to create a persistence of vision or motion perception by the viewer. The developer of the EVB 220 can determine an appropriate frame rate that provides for a seamless, interactive, and well-paced display of the storyline of the EVB 220.

The animations 213 can be from the book 202's artwork 204, which contains imagery. Example imagery includes illustrative, photographic, digital, or graphical artwork. The artwork 204 can be animated and set in motion by the developer to emphasize the original artwork 204, enhance its visual appeal for video format, and maintain an adherence to the look and intent of the original artwork 204. This can include setting the artwork 204 as a whole in motion or breaking the artwork 204 into parts, with motion that is selectively added. The artwork 204 can appear to come to life with the animations 213, which can make reading the EVB 220 more attractive to the reader. The animations 213 or motion can differ from traditional animation because the animations 213 can be subtle while still maintaining a quality of the original artwork 204. Therefore, the reader may not be distracted by too much animation and the reader can have the full reader experience intended by the author of the original book 202.

The various elements 204-213 can be combined by the developer in an appropriate manner using the composition process 214. The composition process 214 may be accomplished using an integrated composition environment and/or using specialized software tools or applications to create the enhanced video book 220. Individual off-the-shelf software tools can be used in the composition process 214. For example, a raster graphics editor and/or a vector graphics editor may be used by the developer to generate or modify animations, graphics, and/or artwork. The outputs of these editors or software tools can then be combined using, for example, a digital visual effects, motion graphics, and compositing application(s) to generate the enhanced video book 220. In some implementations, the artwork 204 (e.g., imagery) within the book 202 can be animated and set in motion to create the animations 213 using one editing application. The music 208 can be added, paced, and/or timed to match timing derived from the book 202 using one or more other editing applications. These components or features can then be synchronized to the video picture using additional editing applications. The voiceover narration 212, described later, can be synchronized to animated read-along text using additional editing applications. The sound effects 210 can also be generated and designed to be synchronized and match the artwork 204 and other components of the EVB 220 using editing applications. The Enhanced video book 220 file can then be rendered and exported as a linear video file having a frame rate based on certain specifications and standards dependent on a delivery method. This step can also be performed by another editing application. Therefore, the EVB 220 can be fully customized using one or more editing applications of the developer's choosing.

The text 206 can be displayed in the enhanced video book 220 along with a corresponding audio tract, such as closed captioning. For example, closed captioning text may not be animated in a word-for-word fashion. The closed captioning text can be enhanced to appear in groupings of lines or sentences that are more interactive and/or engaging to the reader, as described further below.

Still referring to FIG. 2, the enhanced video book 220 can be delivered to an end-user's device screen 218 via the content delivery network 216 (e.g., video content delivery network, broadcast, CDN). The end user (e.g., reader) can view the EVB 220 on the device screen 218. The device screen 218 can be part of a digital device with linear video playback capability. As discussed earlier, the enhanced video book 220 can be streamed (e.g., from a cloud or other remote database), broadcasted, and/or downloaded to the end-user's device.

FIGS. 3A-3E illustrate an example of a protocol for animated read-along text for the enhanced video book of FIGS. 1A-1C. The example protocol for animated read-along text (PART) can be applied to each word in succession. PART is a digital word for word reproduction of verbatim text of published storybooks, picture books, or other books, wherein the reproduced words can be delivered as a video format. PART can be accompanied by the artwork 204 or animations 213 (still or moving), voiceover narration 212, the sound effects 210, and/or the music 208, as described in reference to FIG. 2. Although some of these elements may not be suitable for, or intended for use in traditional motion pictures, film, short film, videos, audio books, or e-books, they can be used to provide more enhanced and visual books to readers (e.g., the enhanced video book 220 in FIG. 2). FIGS. 3A-3E depict five different visual states in connection with words as they are being spoken. One or more other emphasis states can be created and applied to words as they are being spoken.

As depicted, first, in State 1 (FIG. 3A), a line of text ("a giraffe gone quackers") appears. The first word in the text string ("a") has already been spoken so the first word appears in State 5 (e.g., unbolded, opaque font). The remainder of the text in FIG. 3A ("giraffe gone quackers") has not yet been spoked so it is displayed in State 1 format, namely, translucent (e.g., lower than 100% opaque). Therefore, the text can be partially see-through but still readable and legible. This more translucent text matches and represents a visual version of words that are not yet spoken by voiceover, or heard via audio, but forthcoming in an EVB, video, e-book, or other digital linear format. Where there is no voiceover or audio narration with the text, the translucent text can appear sequentially at a pace at which the reader is expected to read the line of text.

Next, in State 2 (FIG. 3B), the word being spoken ("giraffe") is displayed as outlined with a translucent stroke (e.g., the outline has a different opacity than that of State 1) encompassing the word as it is being spoken. This sort of animation can assist the reader in following along at the pace at which the word is being read or spoken. Next, in State 3 (FIG. 3C), the outline encompassing the word being spoken ("giraffe") becomes slightly darker (e.g., more opaque) than in State 2. This state can occur while the word is being spoken to help emphasize the word and/or syllables therein. Next, in State 4 (FIG. 3D), the outline encompassing the word being spoken ("giraffe") resolves to a fully opaque, slightly bolded word. This state can indicate that the word has been read or spoken. Lastly, in State 5, the word being spoken ("giraffe") resolves completely, e.g., into fully opaque, unbolded text. This state can indicate that the word has already been spoken and the words following "a giraffe" are about to be read or spoken. Thus, the emphasis described in relation to the words "a giraffe" can be repeated for each subsequent word in the line of text. Although not shown, the process of transitioning from State 1 through State 5 can repeat for each word in the line of text. Once all the words in the line of text are spoken, all the words can appear in the State 5 emphasis.

As mentioned, a narrator's voice can speak in a timed format and PART can be used to maintain accuracy and consistency of the voice with the animated text. When the narrator's voice is used, the voice may read the word that is being altered through animation via PART, either immediately before, simultaneous, or after. Regardless, the pace at which the voice reads the words can remain consistent for an entire line, sentence, paragraph, page, video, or overall book. This can assist the reader in learning how to read at a steady pace.

The narrated words transition from semi-transparent text (State 1), then fully opaque (State 2), then back to a less opaque version (State 3), settling back to normal (State 4) or semi-transparent (State 5) as the words are spoken. This word synchronization with narration or voiceover can be emphasized at a pace meant to match a range of beats per minute, as defined by the original author, publisher, or developer. Additional factors can be used to determine an appropriate pace to read the words and simultaneously emphasize the words. Those factors can include a storyline of the book, purpose or theme of the book, intended audience of the book, and/or purpose of reading the book (e.g., learning a new language). The animated text pace can be adjusted based on various other factors. For example, the animated text pace can be adjusted based on visual recognition, fixed narration speed, adjustable narration speed, a read-back function adjustment, or a reading level or skill of the reader.

Although FIGS. 3A-3E show an example of text animation involving five successive states, any quantity of states may be used and decided by the developer to suitably emphasize or otherwise draw attention to each word as it is being spoken. Such customization in word emphasis can be advantageous to assist a reader in learning how to read, how to pronounce words, how to pace, and/or how to read faster. In addition, the change states can be indicated in any manner that conveys dynamically which word is being spoken. For example, different colors, fonts, underlining, shading, crosshatching, or the like can be used for the various States 1-5 or any other emphasis states. Alternatively and/or additionally, individual letters within a single word can be visually emphasized (e.g., transition through States 1-5) and/or an entire string of words can be visually emphasized simultaneously as the string is being spoken. Emphasis of words in the line of text can also be advantageous to assist the reader in maintaining focus and interest in reading the enhanced video book.

Figure 9:
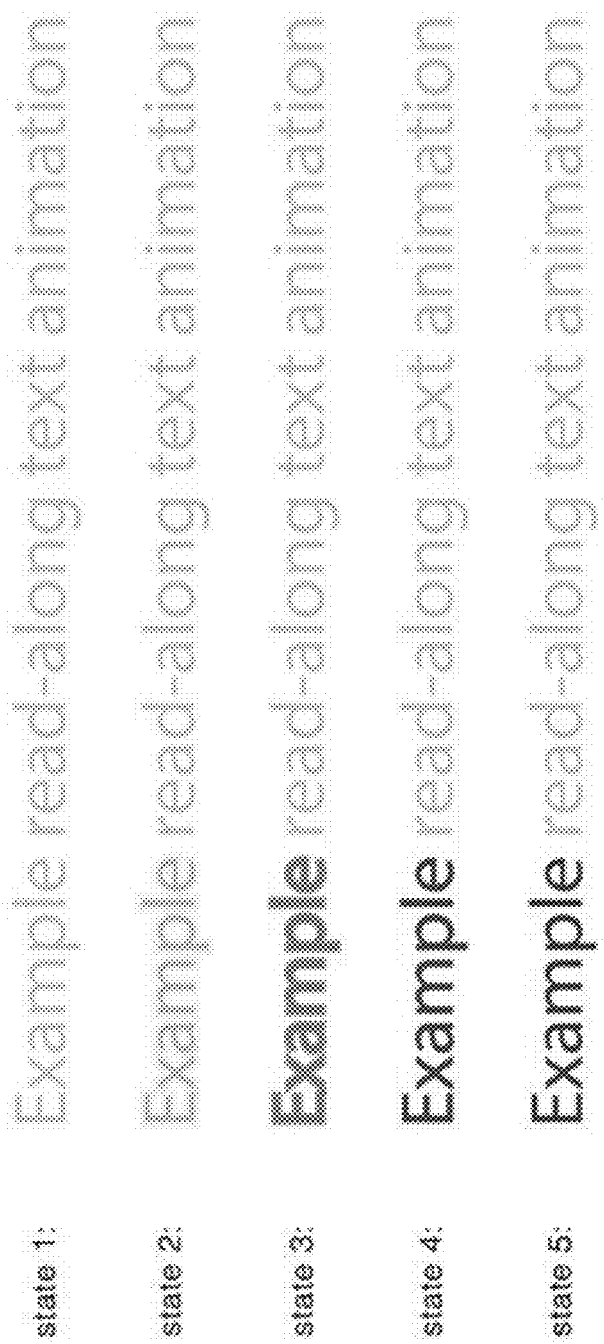
FIG. 9 illustrates another example of a protocol for animated read-along text for the enhanced video book of FIGS. 1A-1C.

FIG. 9 illustrates another example of a protocol for animated read-along text for the enhanced video book of FIGS. 1A-1C. States 1-5 in FIG. 9 can be similar and/or different to the States 1-5 as depicted and described in reference to FIGS. 3A-3C. As shown in FIG. 9, first, in state 1, a line of text ("Example read-along text animation") appears. The first word in the text string ("Example") has not been spoken so it is displayed as outlined with a translucent stroke, which differs from state 5 (e.g., unbolded, opaque font). The remainder of the text in state 1 ("read—along text animation") also has not yet been spoken so it is displayed in state 1 format (e.g., translucent, or less than 100% opaque). Therefore, the text can be partially see-through, yet still be readable and legible, as previously described.

Next, in state 2, the word being spoken ("Example") is displayed as outlined with a translucent stroke (e.g., the outline has a different opacity than that of state 1) encompassing the word as it is being spoken. Next, in state 3, the outline encompassing the word being spoken ("Example") becomes slightly darker (e.g., more opaque) than in state 2. Next, in state 4, the outline encompassing the word being spoken ("Example") resolves to a fully opaque, slightly bolded word. Lastly, in state 5, the word being spoken ("Example") resolves completely (e.g., into fully opaque, unbolded text). Although not shown, the process of transitioning from state 1 through state 5 can repeat for each word as it is spoken, until all of the text in the string has been spoken or read.

In the manner described throughout this disclosure, as voiceover or audio is heard, matching translucent text can animate (e.g., word by word, letter by letter) to become fully opaque. The animation to 100% opaqueness can be synchronized to match timing of the audible words, so that as a word is heard or represented audibly, the same word transitions from translucent to opaque. This animation can be advantageous to assist the reader in reading and learning. Synchronized animation of the text's opacity can be accompanied by additional or alternate animation to add emphasis to each word or letter as it is audibly heard. Examples of additional or alternate animations to add emphasis may include (i) bounds of the text expanding outward momentarily before contracting back again to its original size, (ii) weight of the text changing momentarily before returning to its original weight, (iii) color of the text changing, (iv) an outline or stroke being added to the text, and/or (v) any combination thereof.

In each of the above examples, extra animation applied for emphasis can be applied word by word, or letter by letter, in a synchronized fashion, so as to emphasize the specific word or letters being audibly heard at a given moment. For instances where no words are heard or presented audibly, text animation (e.g., translucency and additional or alternate animation for emphasis) can occur in a sequential order, so as to visually mimic the text as it can be spoken or read. This can assist the reader in establishing a steady pace to read the text.

In reference to FIGS. 3A-3C and FIG. 9, rather than one word being displayed and spoken at a time before the next word is displayed and spoken, an entire sentence (or paragraph or page) of text can be presented to the reader. In such an example, a visual appearance of each words forming the sentence can be altered as that word is spoken. This can provide the reader with an engaging "read-along" experience. This protocol (e.g., PART) can be applied not only to enhanced video books, but also to video segments, e-books, or any other digital linear format where text appears on the screen and is timed in connection with, and/or synchronized to, voiceover or some other audio. Alternatively, when no voiceover or audio is present, or if the sound is muted or otherwise not present, text can appear emphasized on the screen at a pace or timing that is intended to simulate a spoken progression of the text.

Features used in media may include but are not limited to underline, highlight, full bold, etc. PART incorporates more features to text that can benefit the reader in reading, learning how to read, focusing on a storyline, and finding their position in the text. Protocol for animated read-along text can display text along with a corresponding audio track, which is different than traditional closed captioning. Traditional closed captioning text may not be animated in a word for word or letter by letter format. For example, closed captioning, which is the standard for video formats, can provide entire lines, sentences, or paragraphs on the screen without additional animation or emphasis. As a result, the reader can have trouble knowing their position in the text or following along as the text is being read. Animating text using PART, as described herein, can improve different forms of media content that include subtitles or digitally written words, whether the media form is comprised of motion pictures or free of such.

Read-back functionality with animated read-along text can further assist the reader in improving their learning experience. Read-back functionality can use a microphone of the reader's device to listen to the reader as they read aloud text that is being visually emphasized. Reading aloud without assistance can also be used to test the reader's reading accuracy and speed amongst other readers. Again, young readers find difficulty following small font and/or dense text. Animated text can assist such young readers to follow the text outside of merely entertainment purposes. PART can therefore be used to improve educational and entertainment purposes of the enhanced video book. When implemented, the animated text can capture the reader's attention and assist them in maintaining and/or finding their position in the text.

Read-back functionality can be provided at different paces, as described throughout this disclosure. For example, the pace can be based on a narration, speed at which the reader is expected to read the book, a speed that the reader selects, and/or at a rate that a camera (e.g., front-facing) on the reader's device senses the reader's eyes are moving across the page. The rate of eye movement can be based on eye placement on a page/screen and text position.

The animated text can appear in conjunction with an adjustable reading speed that can be set by the reader or another user (e.g., a parent or teacher of the reader). Displaying animated text and narrating at the same time with the ability for one to adjust the speed adds many benefits, as described throughout this disclosure. One may not likely listen to an audio book at 3× speed if their brain cannot decipher all the words that are spoken and maintain an understanding of story. Therefore, the reader can select a different speed, such as 1.5×. Setting speed for animated text allows the reader to speed up or slow down animated text and narration, thereby making the read more enjoyable and engaging for the specific reader. A progression in chosen speed over time can also indicate that the reader is developing their learning and reading skills.

Figure 4:
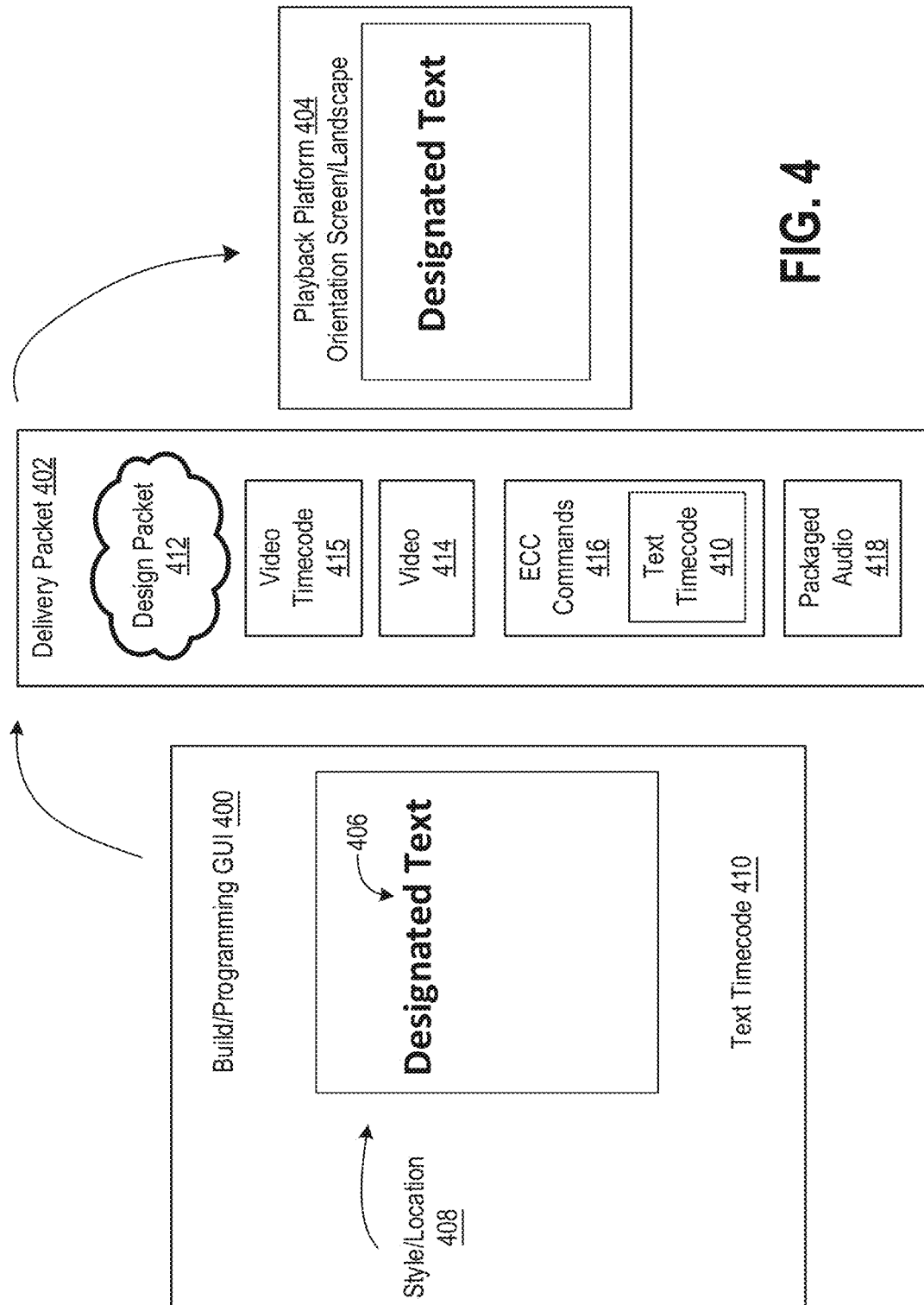
FIG. 4 illustrates an example system and process for generating, delivering, and displaying enhanced closed captioning.

FIG. 4 illustrates an example system and process for generating, delivering, and displaying enhanced closed captioning (ECC). As shown, the ECC system includes three components: a Build/Programming GUI 400, a delivery system 402, and a playback platform 404. The Build/Programming GUI 400 can provide an environment for a content creator (e.g., developer as described throughout this disclosure) to generate customized ECC text having a desired appearance (e.g., font, color, effects) and placed at a desired location in the media. The media can be an enhanced video book, as described herein, or other media formats, such as videos. In the example shown, the content creator has specified that the ECC text "Designed Text" is to appear at location 406 within a screen space 408. In addition, the content creator can specify a text timecode 410 for each item of text, thereby time-synchronizing the ECC text with accompanying video content.

Output of the Build/Programming GUI 400 can be an ECC delivery packet 402, which includes video 414, design packet 412, video timecode 415, ECC commands 416, and packaged audio 418. The ECC commands can also include the text timecode 410, which the content creator determined in the Build/Programming GUI 400.

The ECC delivery packet 402 can be parsed via a playback platform 404 for display on a screen of the playback platform 404. The playback platform 404 can be a reader's device, such as a mobile phone, smartphone, tablet, computer, laptop, TV, e-reader, projector, augmented reality device, or any other type of device having linear video playback functionality. The design packet 412 can be transcoded with the video 414 and/or stored on a server (e.g., cloud or other remote database) and retrieved during transmission of the delivery packet 402 to the playback platform 404. The design packet 412 can then be parsed via the playback platform 404 for streaming. The design packet 412 can include font, location, and/or animation of the text 406. These features in the design packet 412 can be based on the ECC commands 416, which are synchronized to the video timecode 415 and the text timecode 410. Moreover, in some implementations, the delivery packet 402 can pull or retrieve from a cloud server or other database content such as the video 414 that is wrapped in the delivery packet 402.

Conventional closed captioning is a process of displaying text on a television, video screen, or other visual display to enable hearing impaired viewers to understand what words are being spoken (and/or what sounds are being made) in a displayed scene. Such conventional closed captioning techniques typically are limited to a minimal font set and an automatic, fixed placement of text on the screen (e.g., on the bottom third of the screen). The content creator may not have control to change the font set or text placement. As described herein, ECC allows for the content creator to customize text placement and font selection, which in turn allows for creative, template, and custom-designed layouts for multi-language closed caption playback of content. ECC can therefore be advantageous to improve a viewer's experience in reading or viewing the text during video playback.

Once the content creator makes such design choices and coded them into a predefined format, a resulting package (e.g., the delivery packet 402) can be distributed via closed caption protocols using custom tags and calls. The ECC can then displayed on the playback platform 404's screen along with corresponding video content (e.g., the video 414). De-coupling customized ECC from the video content 414 in this manner can provide the content creator with great flexibility in determining where on the screen the captioned text 406 should be displayed and what it should look like (e.g., font selection). When working with ECC, placement of the text 406 can be made based on a per-shot or frame basis. Therefore, the text 406 may not be limited to predetermined locations on the screen, such as a lower third portion of the screen. ECC is fully customizable and defined by the creator of the content rather than a close captioning system. There is no limit to placement of the text 406 on the screen since the content creator can fully customize and design placement tags that map the ECC to any screen and video resolution. The placement tags can be synced via the video timecode 414 and/or the text timecode 410 through a custom dashboard by the content creator. As a result, the content creator can generate a more customized display of text with video content. ECC as described herein can be used in conjunction with one or more other systems and methods as described herein, such as PART and the enhanced video book.

ECC also provides for multi-language support with user-selectable language playback based on the content creator's designed layouts in an original language. ECC also provides for detailed timecode word tracking or synchronization, which allows for per-syllable and/or per-word animation based on timecode of the video and/or the text.

Figure 5:
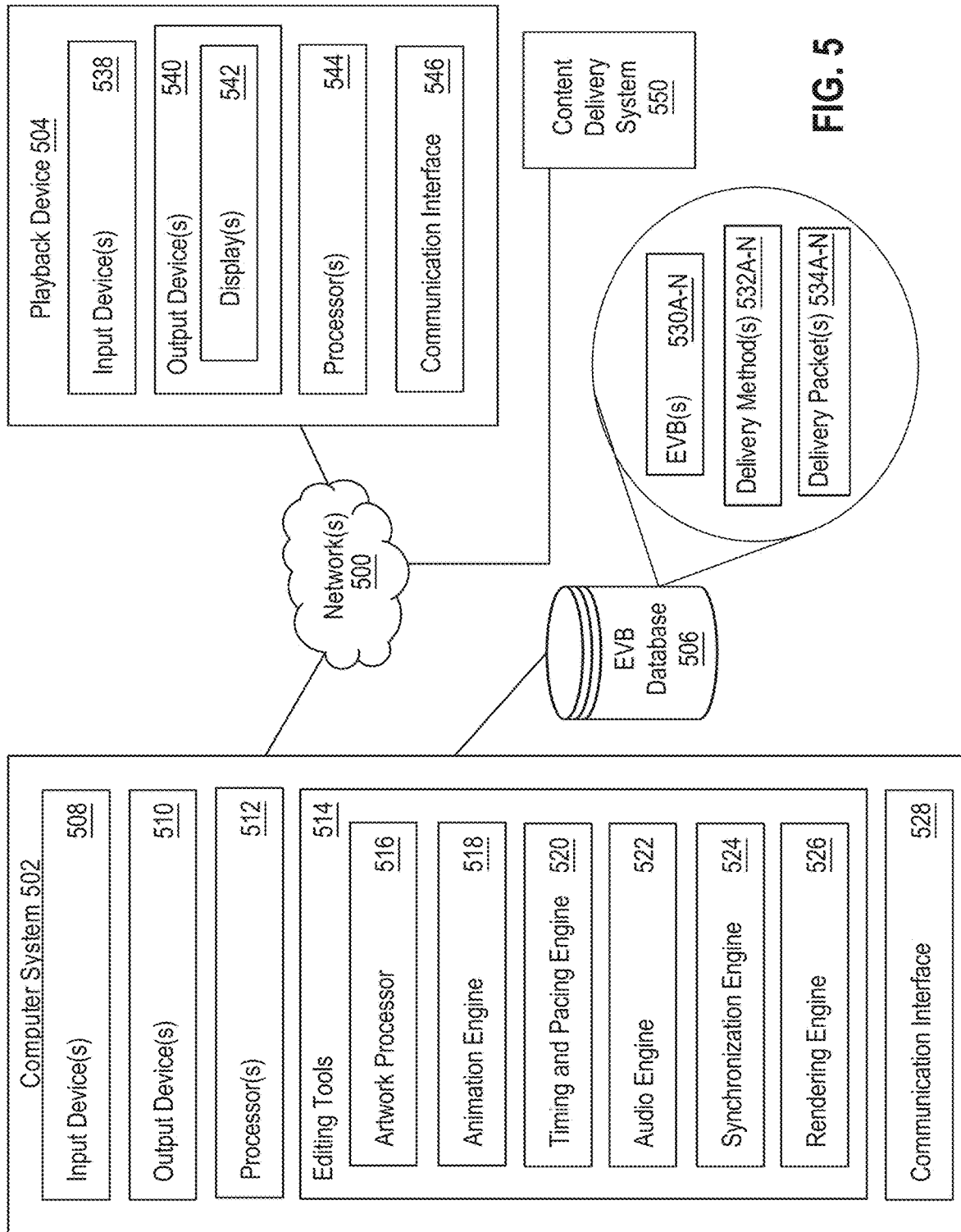
FIG. 5 illustrates example system components for performing one or more of the processes described herein.

FIG. 5 illustrates example system components for performing one or more of the processes described herein. As depicted, a computer system 502, a playback device 504, and a content delivery system 550 can be in communication (e.g., wired and/or wireless) via network(s) 500. The computer system 502 can include input device(s) 508, output device(s) 510, processor(s) 512, editing tools 514, and a communication interface 528. The input device(s) 508 can be a touchscreen, keyboard, mouse, microphone, or any other similar device that is configured for receiving user input. The output device(s) 510 can be a display screen. In some implementations, the input device(s) 508 and/or the output device(s) 510 can be part of a computing device separate from the computer system 508. That computing device can be in communication with the computer system 502 via the network(s) 500. The example computing device can be a tablet, laptop, computer, smartphone, or other mobile device.

As depicted in FIG. 5, the computer system 502 also includes the processor(s) 512, which can be configured to perform one or more operations as described throughout this disclosure.

The editing tools 514 can include an artwork processor 516, an animation engine 518, a timing and pacing engine 520, an audio engine 522, a synchronization engine 524, and a rendering engine 526. One or more other or additional editing tools can be included and/or omitted. One or more of the editing tools 514 can also be off-the-shelf software tools or applications as described herein. In some implementations, one or more of the editing tools 514 can be stored in a cloud or other database and accessed by the computer system 502 via the network(s) 500.

The one or more editing tools 514 can be displayed at the output device(s) 510 of the computer system 502. The computer system 502 can then receive user input from the input device(s) 508 that is associated with the displayed editing tools 514. For example, the user can be developing an enhanced video book. On the output device 510 (e.g., a display screen), the user can select the artwork processor 516. The artwork processor 516 can be an existing software tool or off-the-shelf application. The artwork processor 516 can be displayed on the output device 510 and the user can then provide input to the artwork processor 516 via the input device 508. In some implementations, the artwork processor 516 can be configured to receive scanned images of pages of a physical book such that the physical book can be converted into an electronic book format. Thus, the user can scan the pages of the physical book using a scanner (e.g., the input device 508), which is then received and processed by the artwork processor 516. The artwork processor 516 can convert the scanned pages of the physical book into editable artwork and text.

The user can also provide input to the animation engine 518. The animation engine 518 can be an existing software tool or off-the-shelf application. The animation engine 518 can be configured to receive user input indicating placement, appearance, motion, and/or animation of one or more of the converted artwork and the converted text, as described throughout this disclosure. The animation engine 518 can then animate the converted artwork and/or the converted text based on the user input.

The user can also provide input to the timing and pacing engine 520. The timing and pacing engine 520 can be an existing software tool or off-the-shelf application. The engine 520 can be configured to receive user input indicating a pace at which the converted text can be read, a timing at which animations of the converted text or the converted artwork can occur, and other timing and pacing features as described throughout this disclosure. The timing and pacing engine 520 can accordingly pace or time one or more features of the enhanced video book.

User input can also be provided to the audio engine 522. The audio engine 522 can be an existing software tool or off-the-shelf application. The engine 522 can be configured to receive user input indicating music or sound effects to add to the converted artwork and text. The user input can also include voice-over narrations of the converted text. In some implementations, the user can generate or create the music, sound effects, and/or voice-over narrations. In other implementations, the user can select the music and/or sound effects from a library of audio clips or files. The library of audio clips or files can be provided by the audio engine 522 and/or stored in a cloud or other database and accessible through the network(s) 500. The engine 522 can then add the selected voice-over narrations, music, and/or sound effects to user designated portions of the enhanced video book.

User input can also be provided to the synchronization engine 524. The synchronization engine 524 can be an existing software tool or off-the-shelf application. The engine 524 can be configured to synchronize or align the converted artwork, the converted text, voice-over narrations, music, and/or sound effects, and any animations, as described throughout this disclosure. For example, the synchronization engine 524 can match up voice-over narrations with animated text to provide for read-along capabilities. As described throughout this disclosure, the synchronization engine 524 can also synchronize a video, video timecode, audio package, and enhanced closed caption commands into a delivery packet. The delivery packet can then be transmitted to the playback device 504 upon playback request from the device 504. In some implementations, the engine 524 can automatically synchronize these features of the enhanced video book as they are generated by one or more of the editing tools 514. For example, when the animation engine 518 animates text, the synchronization engine 524 can automatically synchronize the animated text with any other features of the enhanced video book, such as voice-over narrations.

The editing tools 514 can also include the rendering engine 526. The rendering engine 526 can be an existing software tool or off-the-shelf application. The engine 526 can be configured to render the enhanced video book for playback on the playback device 504. Rendering the enhanced video book by the computer system 502 (e.g., server side) rather than the playback device 504 can be advantageous to ensure the enhanced video book can be quickly streamed or broadcasted at the playback device 504. In other words, the enhanced video book may not buffer upon delivery and payback at the playback device 504. Therefore, bigger enhanced video book files can be delivered and played at the playback device 504. In addition, the playback device 504 can have faster bandwidth for streaming any size enhanced video book when the enhanced video book is rendered at the computer system 502.

The communication interface 528 can provide for communication between any one or more of the components of the computer system 502 with any other components (e.g., the playback device 504, the content delivery system 550) via the network(s) 500.

The computer system 502 can also be in communication with an enhanced video book ("EVB") database 506. The database 506 can be a cloud or other form of storage that is accessible via the network(s) 500. The database 506 can store enhanced video books 530A-N that are generated by the computer system 502, delivery methods 532A-N that are used to deliver the enhanced video books 530A-N for playback at playback devices having different playback or delivery requirements, and delivery packets 534A-N. The delivery packets 534A-N, as described herein (e.g., refer to FIG. 4), can include a design packet, as described throughout this disclosure, video, video timecode, enhanced closed captioning commands, and/or packaged audio. The delivery packets 534A-N can be rendered a first time that an associated enhanced video book is requested for playback by a playback device. As a result, the enhanced video book can be quickly streamed or broadcasted to the playback device with minimal or no buffering time. Storing the delivery packets 534A-N in the EVB database 506 can be advantageous so that rendering time can be reduced. Moreover, this is advantageous so that an enhanced video book need only be rendered at a first playback request rather than with every playback request.

As an example, the playback device 504 can request the enhanced video book to be played with Spanish subtitles. The computer system 502 can receive this request and render the book with Spanish subtitles in the rendering engine 526. The rendered enhanced video book file can then be communicated over the network(s) 500, through the content delivery system 550, and to the playback device 504.

The playback device 504 can then play the enhanced video book with Spanish subtitles. Once the computer system 502 renders the enhanced video book with Spanish subtitles, the computer system 502 can store it in the EVB database 506. Therefore, whenever any subsequent playback devices request the enhanced video book with Spanish subtitles, the computer system 502 can quickly and easily retrieve the already rendered enhanced video book with Spanish subtitles from the EVB database 506 and provide that to the playback device. This can provide for faster streaming and/or broadcasting, reduced and/or non-existent buffering, and reduced time rendering the enhanced video book. In other words, the enhanced video book does not have to be rendered every time that it is requested for playback at a playback device.

Still referring to FIG. 5, the computer system 502 can communicate with the content delivery system 550 when delivering an enhanced video book to the playback device 504. The content delivery system 550, as described herein (e.g., refer to the content delivery network 216 in FIG. 2) can provide the enhanced video book (e.g., via the delivery packet) to the playback device 504. In some implementations, the content delivery system 502 can render the enhanced video book for playback. In other implementations, the content delivery system 502 can retrieve an already rendered enhanced video book from the EVB database 506 and delivery that rendered file to the playback device 504. In yet other implementations, the content delivery system 550 can be part of the computer system 502. For example, the rendering engine 526 and the content delivery system 550 can be one in the same and/or subcomponents of each other.

Still referring to FIG. 5, the playback device 504 can include input device(s) 538, output device(s) 540, processor(s) 544, and communication interface 546. The input device(s) 538 can be a touchscreen, keyboard, mouse, microphone, or any other similar device that is configured for receiving user input. The output device(s) 540 can include display(s) 542. The display(s) 542 can be a screen. The playback device 504 can be a tablet, laptop, computer, smartphone, e-reader, TV, augmented reality device, projector, or other device having video playback capabilities. The processor(s) 544 can be configured to perform one or more operations as described throughout this disclosure (e.g., sending a playback request to the computer system 502). The communication interface 546 can provide for communication between any components of the playback device 504 with any other components (e.g., the computer system 502, the content delivery system 550) via the network(s) 500.

The display 542 can provide a user of the playback device 504 with a graphical user interface (GUI). The GUI can include prompts requesting input from the user. Example user input can include selection of an available enhanced video book for playback, selection of a pace at which to read or play an enhanced video book, selection of a subtitle language for an enhanced video book, pausing an enhanced video book during playback, and/or stopping an enhanced video book during playback. Using the received user input, the processor(s) 544 can send playback requests to the computer system 502.

Figure 6A:
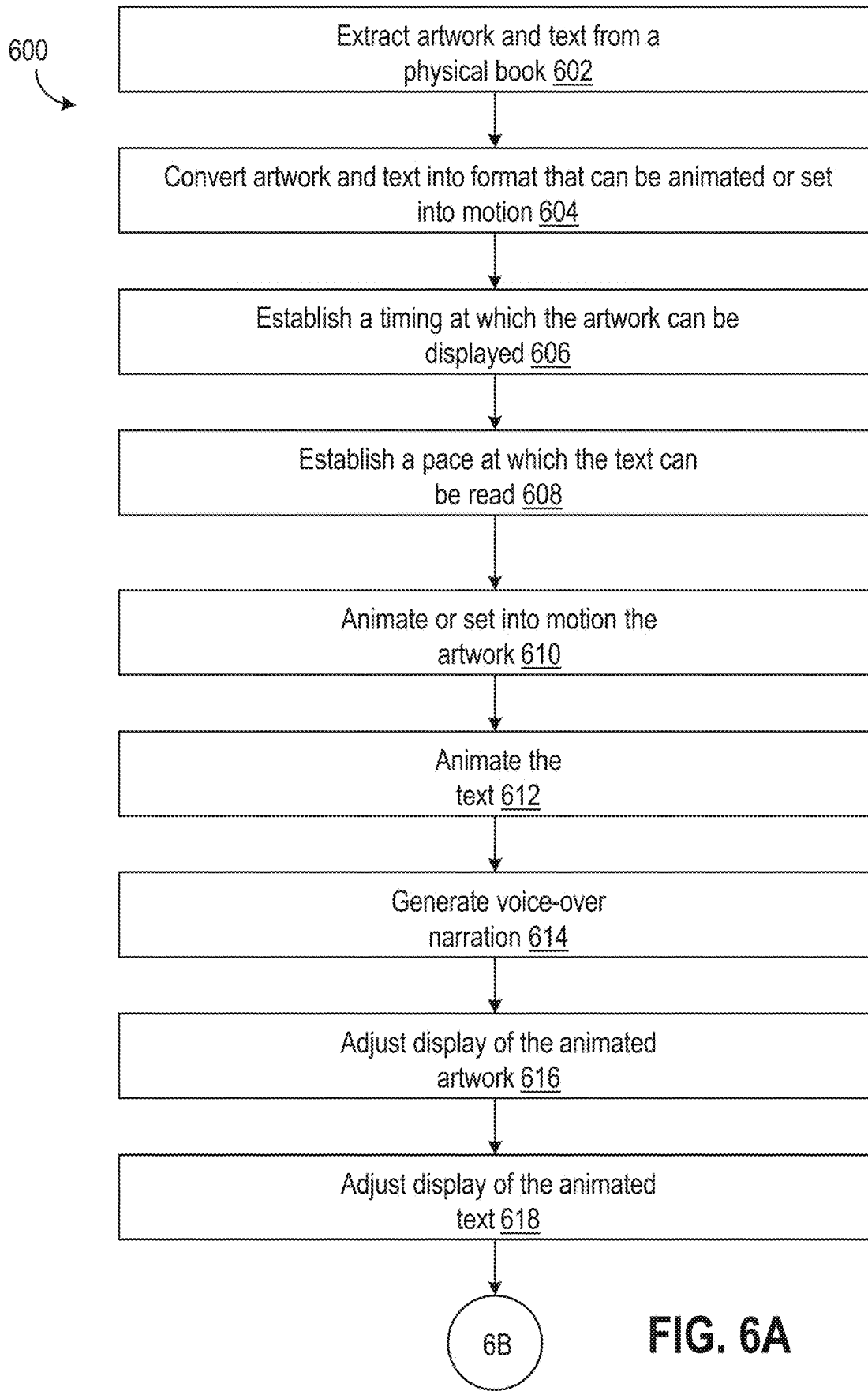
FIGS. 6A-6B is a flowchart of an example process for creating an enhanced video book.
Figure 6B:
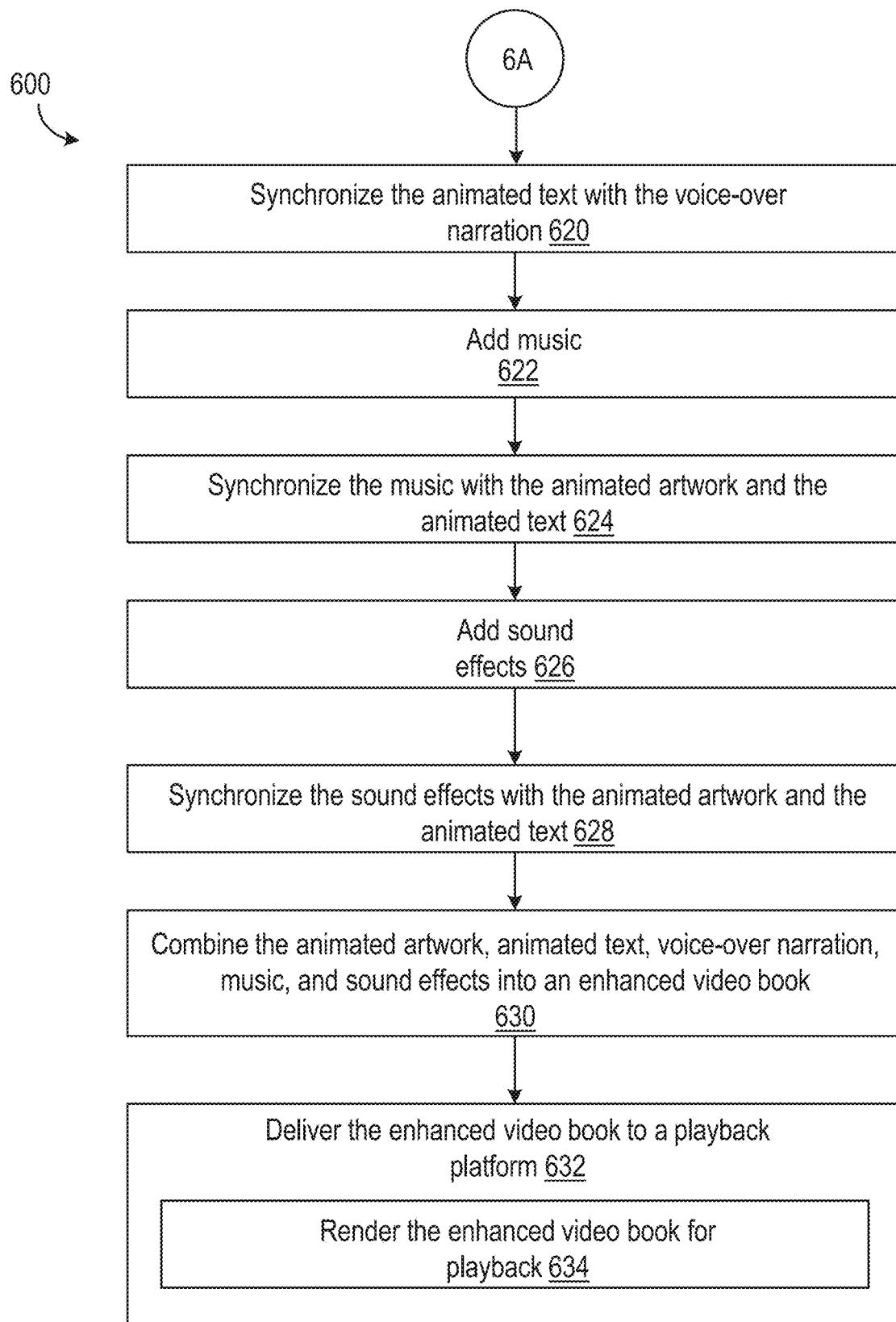

FIGS. 6A-6B is a flowchart of an example process 600 for creating an enhanced video book. Any of the steps in the process 600 can be performed by a developer (e.g., content creator) using one or more known techniques, editing applications (e.g., refer to FIG. 5), and/or software applications or tools.

Referring to FIGS. 6A-6B, at 602, artwork and text can be extracted from a physical book. Extracting at least one of artwork and text from a physical book can include scanning pages of the physical book into a user device. The extracted artwork and text can also be broken up into pieces or layers such that each piece or layer can be more easily animated or set in motion. As described throughout this disclosure, in some implementations, the physical book may not be received at the user device. Instead, a storyline (e.g., text) can be provided to the user device, where the storyline does not include artwork or originate from a physical book. Therefore, the process 600 can include generating artwork and/or additional text for the received storyline. In other implementations where the physical book is not received at the user device, video or animated images can be received at the user device. Therefore, the process 600 can include generating text and/or a storyline for the received video or animated images.

At 604, the artwork and text can be converted into a format that can be animated or set into motion. As mentioned above, converting the extracted art and text can also include breaking up the extracted artwork and text into one or more layers. The one or more layers can each be animated or set into motion. Optionally, the developer can also determine one or more pauses in at least one portion of the converted artwork and text. The developer can also generate one or more prompts that correspond to the one or more pauses and a storyline of the enhanced video book. As a result, when the enhanced video book is played back at a device, a viewer can pause the book at one of the designated pauses and review one or more prompts that correspond to the pause. This feature can improve the viewer's learning and reading experiences. This feature can also provide enough interactive elements in the enhanced video book that keep the viewer's attention and make the reading experience captivating without distracting the viewer from completing the enhanced video book.

At 606, a timing at which the converted artwork can be displayed can be established. Establishing the timing can be based on at least one of a length of the physical book, a quantity of extract artwork, and/or a quantity of extracted text.

At 608, a pace at which the converted text can be read can be established. The pace corresponds to timing of one or more features in the enhanced video book, such as animation of the converted artwork. Establishing the pace can be based on at least one of an age group of readers of the physical book, a reader skill level, and a quantity of extracted text. As described throughout this disclosure, the pace can also be adjusted by a reader and/or change over time as the reader reads more of the enhanced video book.

At 610, at least one portion of the converted artwork can be animated or set into motion. At least one animated or set into motion portion of the converted artwork can be a character or an object (e.g., refer to FIGS. 1A-1C). The developer can animate different layers of the converted artwork and/or text using any of the techniques described herein (e.g., ECC and/or PART). In so doing, the developer can create a more integrative and interactive enhanced video book without having too many distracting elements.

At 612, at least one portion of the converted text can be animated or set into motion. One or more techniques described herein, such as in reference to ECC and/or PART, can be employed by the developer. As a result, animated text can provide for a more interactive and engaging reading and learning experience for the reader.

At 614, voiceover narration can be generated. The voiceover narration corresponds to the converted text. The developer can use known techniques to generate the voiceover narration. Moreover, the voiceover narration can be generated for one or more different languages. The reader can then request the enhanced video book to be played in one or more of the different languages. Therefore, the enhanced video book can be read by readers having different language preferences and/or learning or reading goals or capabilities.

At 616, display of the at least one animated or set into motion portion of the converted artwork can be adjusted based on a time at which the converted artwork can be displayed. The animated portions of the converted artwork can also be adjusted to be aligned with a pace of the voiceover narration or a pace at which the text would normally be read. This step can be performed to ensure that the animated artwork is not disjointed or misaligned with one or more other components of the enhanced video book.

At 618, display of the at least one animated portion of the converted text can be adjusted based on the pace at which the converted text can be read. For example, the animated text can be synchronized to display on a screen as the text is narrated or read via the voiceover. This step can be performed to ensure that the reader can follow along with the text as it is being read. As a result, the reader can improve their reading comprehension and learning experience.

At 620, at least one animated portion of the converted text can be synchronized the with the voice-over narration. This step can optionally be performed as part of 618. This step can also include using PART, as described throughout this disclosure, to provide emphasis to words or letters as they are read. Performing this step is advantageous to ensure that the reader can read along with the text, thereby improving the reader's reading and learning skills.

At 622, music can optionally be added to the converted artwork. Adding music can assist the reader in being engaged and maintaining such interest in a storyline of the enhanced video book. This audio can also assist the reader in understanding or conceptualizing different vocabulary in the enhanced video book. The audio can be generated by the developer. The audio can also be premade and retrieved from online, cloud-based, or other database services and added to the enhanced video book.

At 624, the music can be synchronized with at least one of the at least one animated or set into motion portion of the converted artwork, the at least one animated portion of the converted text, and the voice-over narration. Performing this step can provide for a more seamless integration of components of the enhanced video book, which can provide for a more enjoyable and captivating reading and learning experience.

At 626, sound effects can also be added. As described above with reference to the music, the sound effects can make the enhanced video book more engaging to the reader. The sound effects can also assist the reader in understanding or conceptualizing vocabulary and/or the storyline. The sound effects can be generated by the developer. The sound effects can also be pre-made and retrieved from online, cloud-based, or other database services and added to the enhanced video book.

At 628, the sound effects can be synchronized with the animated art work and the animated text, as described in reference to synchronizing the music in 624.

At 630, the converted artwork, the converted text, the at least one animated or set into motion portion of the converted artwork, the at least one animated portion of the converted text, the voice-over narration, and the audio can be combined into an enhanced video book. In other words, as described in reference to FIG. 4, these components can be combined into a design packet. The design packet can be delivered to a playback platform or device for playback.

At 632, the enhanced video book can be delivered to a user device for playback based on a delivery method. The defined delivery method can be a streamed or broadcast delivery method. As described in reference to FIG. 4, the enhanced video book can be encapsulated in a delivery packet. The delivery packet can be transmitted to the user device upon receiving a request from the user device to play the enhanced video book. Delivery of the enhanced video book can be facilitated by a content delivery network (e.g., refer to FIG. 2).

At 634, delivering the enhanced video book can include rendering the enhanced video book into a linear video file and exporting the linear video file based on the defined delivery method. The linear video file can have a frame rate based on one or more specifications that correspond to the defined delivery method.

Once the enhanced video book is rendered a first time, the rendered linear video file can be stored in a database (e.g., cloud). As a result, whenever subsequent user devices request the enhanced video book for playback, the rendered linear video file can be provided to the subsequent user devices. Therefore, the enhanced video book does not need to be rendered for every user request, which can improve streaming the enhanced video book. In other words, the enhanced video book may not buffer during playback at the subsequent user devices. Therefore, as described throughout this disclosure, the user device can receive the rendered linear video file and immediately play the file. The user device can have linear video playback capability and be any one of a mobile phone, tablet, laptop, e-reader, TV, augmented reality device, projector, computer, or other payback device.

Figure 7A:
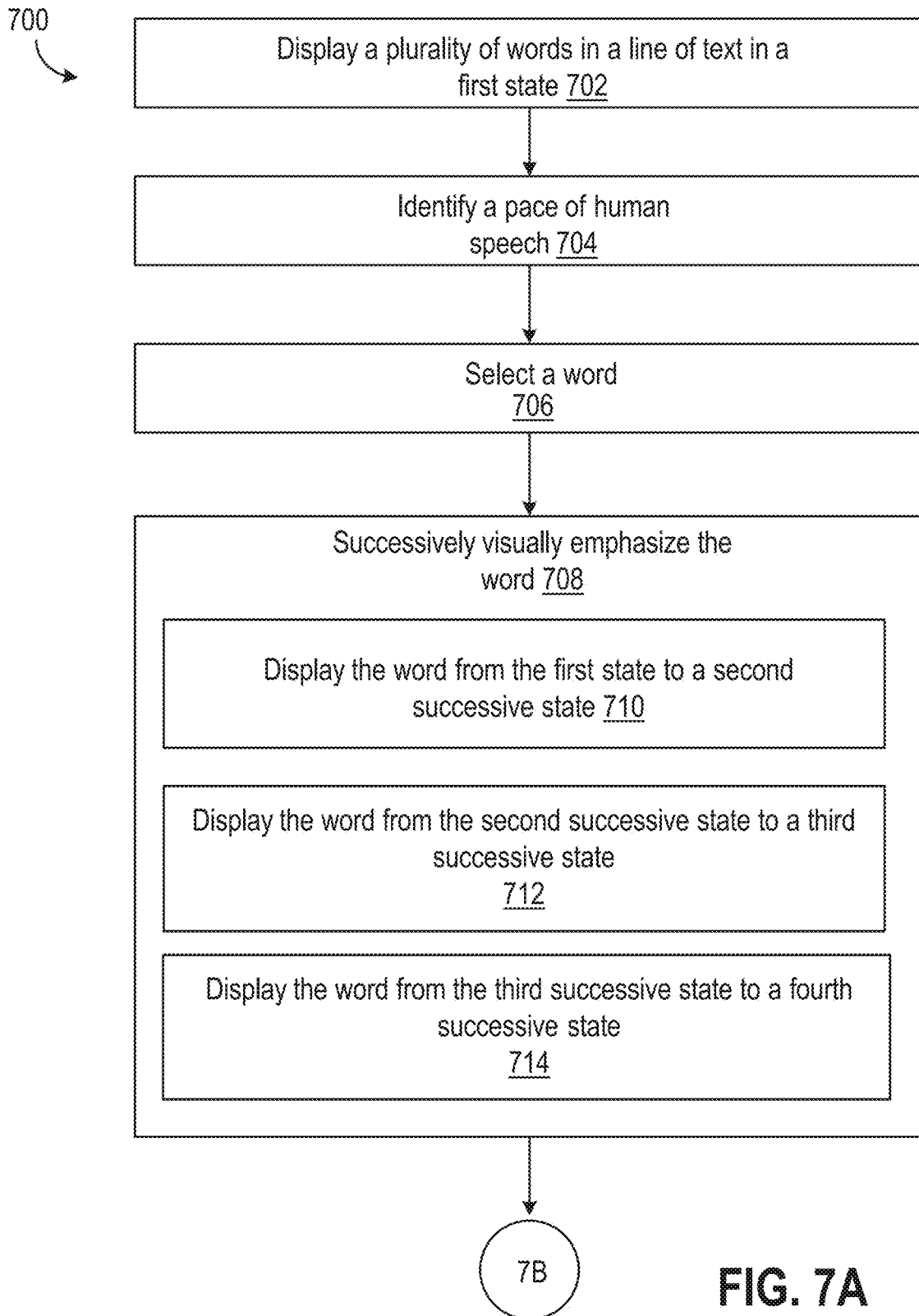
FIGS. 7A-7B is a flowchart of an example process for animating read-along text.
Figure 7B:
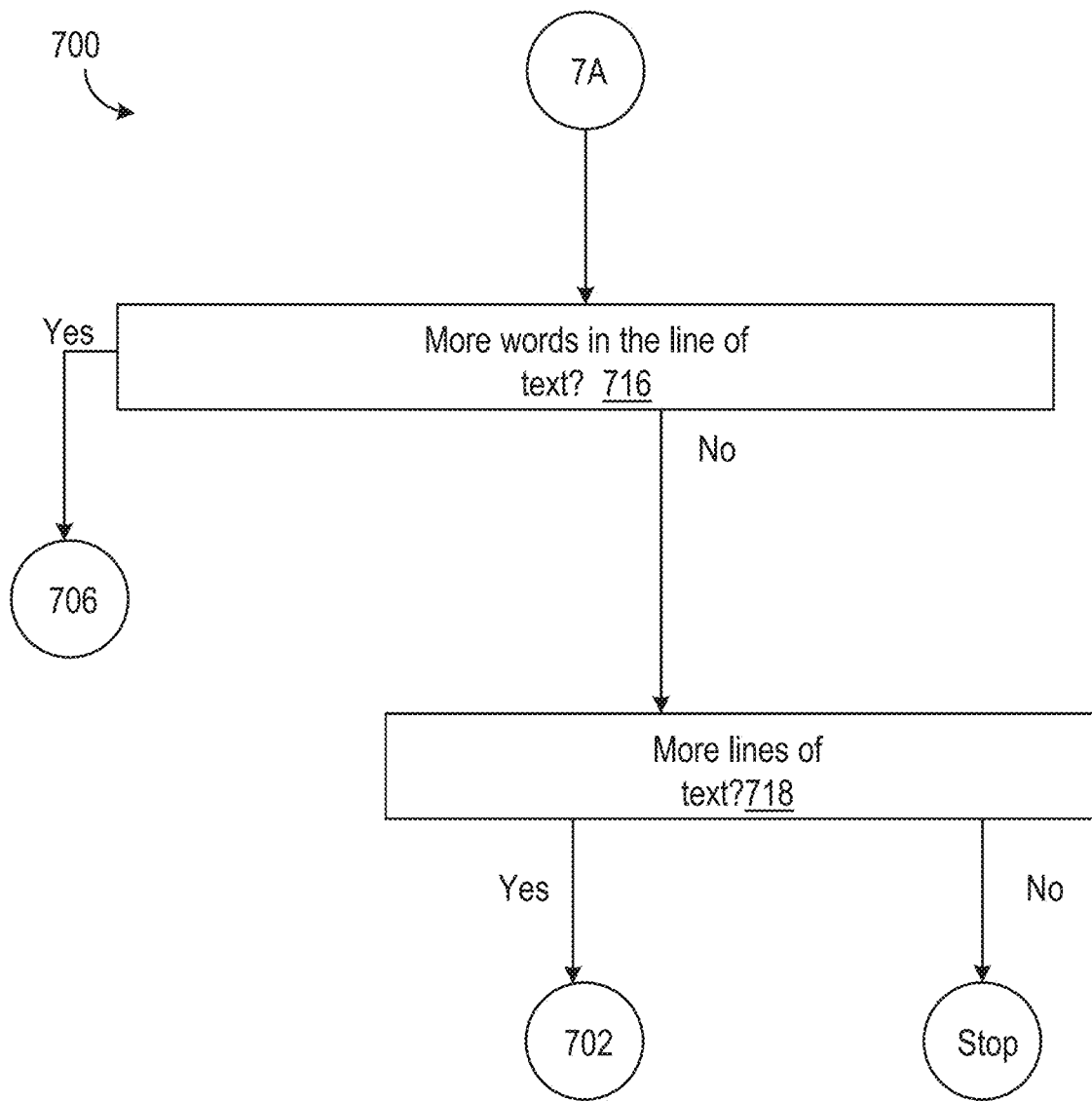

FIGS. 7A-7B is a flowchart of an example process 700 for animating read-along text. The process 700 can relate to PART, as described throughout this disclosure (e.g., refer to FIGS. 3A-3E and FIG. 9).

Referring to FIGS. 7A-7B, at 702, a line of text having multiple words can be displayed. At 704, a pace of human speech can be identified. The developer can identify or designate a proper pace at which the line of text should be read. As described herein, this determination can be made based on an intended audience and/or a reading or skill level of the reader. In some implementations, each of the words can be successively visually emphasized at a pace that mimics a number of syllables in each of the words. The pace of human speech can be based on at least one of an age group of readers, a reader skill level, and a number of words in the multiple words. In other implementations, each of the words can be successively visually emphasized at a pace that is set by a reader at a user device. Each of the words can also be successively visually emphasized at a pace corresponding to a rate at which a user's eye moves across a screen of a user device. The screen can display the line of text having the words and each of the words can be successively visually emphasized at a pace corresponding to a speed at which a user reads the line of text.

At 706, a word from the line of text can be selected. In other implementations, the developer can choose to select more than one word to be emphasized together. The developer can choose a first word that the developer wants to emphasize as it is being read or narrated using voiceover or other audio in the enhanced video book.

At 708, the selected word can be successively visually emphasized at a pace of human speech. The selected word can appear in a first state (e.g., refer to FIG. 3A and FIG. 9). The first state can correspond to a degree of opacity that is less than 100 percent. The developer can adjust or customize the first state as well as any of the other emphasis states described herein based on preference of the developer, an author of a storyline of the text, and/or any other factors, as described throughout this disclosure.

At 710, the word can be successively visually emphasized at the pace of human speech from the first state to a second state (e.g., refer to FIG. 3B and FIG. 9). The second state can include adding an outline to the emphasized word. Displaying the emphasized word from the first state to the second state can include incrementally increasing a degree of opacity. In other words, as the emphasized word is being read or narrated, the word can seamlessly transition from one state to a next state. This seamless transition of states can assist the reader in following along, knowing their position in the text, reading the text, and/or understanding pronunciation of the text. In some implementations, the outline displayed in the second state can also be a color variant that is different from a color of the emphasized word.

At 712, the word can be successively visually emphasized from the second state to a third state (e.g., refer to FIG. 3C and FIG. 9). The third state can include making the emphasized word into heavier-weighted text. Displaying the emphasized word from the second state to the third state can also include incrementally increasing the degree of opacity.

At 714, the word can be successively visually emphasized from the third state to a fourth state (e.g., refer to FIG. 3C and FIG. 9). The fourth state can include depicting the emphasized word as regular text. Displaying the emphasized word from the third state to the fourth state can also include increasing the degree of opacity to 100 percent. In this example process 700, four different emphasis states are described. However, one or more additional or fewer states can be used to emphasize the words in the line of text. The developer can decide how many states to use and what emphasis should be included for each state based on a variety of factors, as described throughout this disclosure.

Next, in 716, it can be determined whether there are more words in the line of text. If there are, then steps 706-714 can be repeated for every subsequent word. In other words, each of the words in the line of text can be visually emphasized one at a time. For example, a first word of the words can be displayed in the third state when a second word of the words can be displayed in the second state. As another example, the first word of the words can be displayed from the third state to the fourth state when the second word of the words can be displayed from the second state to the third state and a third word of the words can be displayed in the second state (e.g., refer to FIGS. 3A-3E and FIG. 9).

If there are no more words in the line of text that can be emphasized, then it can be determined whether there are more lines of text that can be emphasized in 718. If there are more lines of text, then steps 702-716 of the process 700 can be repeated for each subsequent line of text. For example, a second line of text having a second set of words can be displayed. Each of the second set of words in the second line of text can be displayed in the first state, then successively visually emphasized and displayed from the first state to the second state, the third state, the fourth state, and any additional states of the developer's choosing.

If there are no more lines of text, then the process 700 can end. In other words, the developer may have emphasized each of the lines of text for an enhanced video book and or a portion or scene from the enhanced video book or other digital media format.

In some implementations, the developer can decide to emphasize one or more letters of each of the words in a successive manner as described in the process 700. For example, each letter of each of the words can be displayed in the second state, the third state, and the fourth state. Each of the letters can then be successively visually emphasized as each of the words are dictated with voiceover narration.

Figure 8:
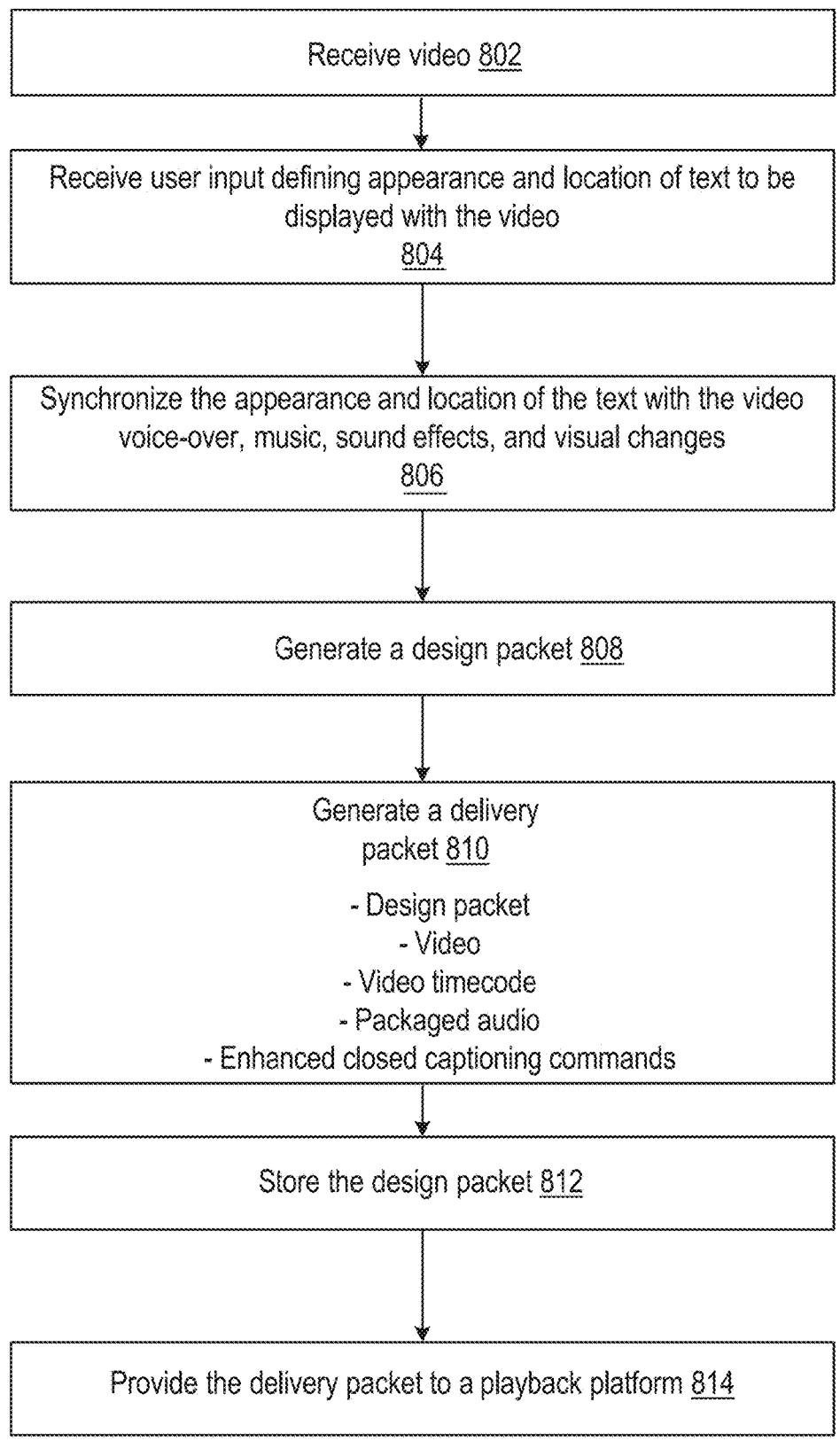
FIG. 8 is a flowchart of an example process for generating enhanced closed captioning commands.

FIG. 8 is a flowchart of an example process 800 for generating enhanced closed captioning (ECC) commands. The process 800 can be used in conjunction with one or more other systems and methods described herein to generate an enhanced video book (e.g., refer to FIG. 4).

At 802, a video having multiple frames can be received in a content building environment. For example, a developer can upload or import the video into an existing editing or software tool or application. The video can include at least one of animated images and still images that are pieced together in the frames. The video can be an enhanced video book file, as described throughout this disclosure. The developer can upload the video that the developer would like to add enhanced closed captioning to.

At 804, user input defining an appearance and a location of text to be displayed along with the video can be received. In other words, the developer can indicate where the text (e.g., ECC) should appear on a screen relative to placement of the images in the video (e.g., refer to FIG. 4). The appearance and the location of text can correspond to one or more of the frames of the video. For example, the developer can choose to include the ECC only on some frames of the video while other frames of the video may not have any text overlay. The user input can define the appearance of text including at least one of a font, color, size, and emphasis of the text. The developer can also provide input to the content building environment that includes an appearance and a location for each word in a line of text. For example, the developer can use PART, as described in reference to FIGS. 3A-3C, 7A-7B, and 9, to create read-along text.

At 806, the appearance and the location of text can be synchronized with each of the frames of the video. The appearance and the location of text can also be synchronized with an audio package of the video. The audio package can include at least one of a voiceover narration, music, and sound effects. Synchronization can be performed as described throughout this disclosure (e.g., refer to FIG. 2 and FIGS. 6A-6B) to provide for a seamless and interactive reading, viewing, and/or learning experience.

At 808, a design packet can be generated based on the received user input. The design packet can include the appearance and the location of text to be displayed along with the video. The design packet can optionally be transcoded with the video. In some implementations, a design packet can be generated for each enhanced video book or other digital media format. Therefore, the same design packet can be used every time that a user device requests playback of the associated enhanced video book or other digital media format. The developer may only have to generate the design packet once, which increases efficiency in generating enhanced video books or other digital media formats using the process 800 and any of the systems and methods described herein.

At 810, a delivery packet can be generated. The delivery packet can include the design packet, video, video timecode, text timecode, and enhanced closed captioning commands. The enhanced closed captioning commands can include instructions for displaying the text along with the video during playback at the user device. The delivery packet can also include packaged audio. Generating the delivery packet can include rendering components of the delivery packet for playback at the user device. Rendering the enhanced video book or other digital media format before delivery to the user device can be advantageous to improve streaming and broadcasting and to reduce or eliminate buffering at the user device. Therefore, the user device can more quickly and seamlessly display the content for playback.

At 812, the delivery packet can be stored in a database. The database, as described herein, can be cloud-based and/or any other type of remote data storage facility that is accessible via a network communication (e.g., wired and/or wireless). Storing the delivery packet in the database is beneficial because whenever subsequent user devices request an enhanced video book file or other digital media format that has already been rendered and prepared for playback, the stored delivery packet can be retrieved and sent to the user device. Rendering is not required on a per-device basis. Thus, the enhanced video book or other digital media format can be quickly streamed or broadcasted at the subsequent user device with minimal or no buffering.

At 814, the delivery packet can be provided to the user device for playback. Example user devices can include a mobile phone, a laptop, a tablet, an e-reader, a TV, or any other playback device. The delivery packet can be provided to the user device upon request from the user device. In some implementations, the delivery packet can be parsed by the user device. Moreover, as described above, when a second user device or any subsequent device requests playback of the enhanced video book or other digital media format, the associated delivery packet can be retrieved from the database and transmitted to the device for immediate playback.

A number of implementations have been described. Nevertheless, it will be understood that various modifications can be made without departing from the spirit and scope of the invention.

What is claimed is:

1. A method for displaying emphasized text, the method comprising:
   displaying a line of text having a plurality of words, wherein each of the plurality of words in the line of text is displayed in a first state when each of the plurality of words in the line of text is not yet spoken by a user;
   receiving, from an input device, audio signals representing a user's voice as the user begins to speak the line of text having the plurality of words;
   determining a first pace at which the user reads based on identifying words spoken in the audio signals, and comparing the determined first pace to a second pace at which the user is expected to speak the words, wherein the second pace is based at least in part on an age and expected reading level of the user; and
   successively visually emphasizing each of the plurality of words at the first pace, wherein emphasizing each of the plurality of words comprises:
      displaying an emphasized word from the first state to a second state successive to the first state when, based on the audio signals, the user is expected to speak the emphasized word, wherein the emphasized word is displayed as having an outline;
      displaying the emphasized word from the second state to a third state successive to the second state when, based on the audio signals, the user is speaking the emphasized word, wherein the emphasized word is displayed as heavier-weighted text; and
      displaying the emphasized word from the third state to a fourth state successive to the third state when, based on the audio signals, the user has completed speaking the emphasized word, wherein the emphasized word is displayed as plain text;
   wherein each of the plurality of words is visually emphasized one at a time such that a first word of the plurality of words is displayed in the third state when a second word of the plurality of words is displayed in the second state, when, based on the audio signals, the user is expected to speak the second word, and the first word of the plurality of words is displayed from the third state to the fourth state when the second word of the plurality of words is displayed from the second state to the third state when, based on the audio signals, the user is speaking the second word, and a third word of the plurality of words is displayed in the second state when, based on the audio signals, the user is expected to speak the third word.

2. The method of claim 1, wherein the first state corresponds to a degree of opacity that is less than 100 percent.

3. The method of claim 2, wherein displaying the emphasized word from the first state to the second state includes incrementally increasing the degree of opacity.

4. The method of claim 3, wherein displaying the emphasized word from the second state to the third state includes incrementally increasing the degree of opacity.

5. The method of claim 4, wherein displaying the emphasized word from the third state to the fourth state includes increasing the degree of opacity to 100 percent.

6. The method of claim 1, wherein the second pace is further based on a number of syllables in each of the plurality of words.

7. The method of claim 1, wherein the input device is a microphone of a user computing device, and wherein the user computing device displays the line of text having the plurality of words to be read by the user.

8. The method of claim 1, further comprising:
   displaying a second line of text having a second plurality of words, wherein each of the second plurality of words in the second line of text is displayed in the first state when each of the second plurality of words in the second line of text is not yet spoken by the user;
   successively visually emphasizing each of the second plurality of words at the first pace based on displaying each of the second plurality of words in the second state, the third state, and the fourth state as the user speaks each of the second plurality of words.

9. The method of claim 1, wherein each of the plurality of words is successively visually emphasized at a third pace that is set by the user at a user computing device.

10. The method of claim 1, further comprising successively visually emphasizing each letter of each of the plurality of words at the first pace, wherein each letter of each of the plurality of words is displayed in the second state, the third state, and the fourth state as the user speaks each letter of each of the plurality of words.

11. The method of claim 1, wherein each of the plurality of words is successively visually emphasized as each of the plurality of words is dictated with voice-over narration.

12. The method of claim 1, wherein the outline displayed in the second state is a color variant that is different from a color of the emphasized word.

13. The method of claim 1, further comprising successively visually emphasizing each of the plurality of words at a fourth pace corresponding to a rate at which a user's eye movements are tracked across a screen of a user computing device, wherein the screen displays the line of text having the plurality of words.

14. A computing system for displaying emphasized text, the computing system comprising:
- one or more processors; and
- one or more storage devices storing instructions that, when executed by the one or more processors, cause the one or more processor to:
  - display a line of text having a plurality of words, wherein each of the plurality of words in the line of text is displayed in a first state when each of the plurality of words in the line of text is not yet spoken by a user;
  - receive, from an input device, audio signals representing a user's voice as the user begins to speak the line of text having the plurality of words;
  - determine a first pace at which the user reads based on identifying words spoken in the audio signals, and comparing the determined first pace to a second pace at which the user is expected to speak the words, wherein the second pace is based at least in part on an age and expected reading level of the user; and
  - successively visually emphasize each of the plurality of words at the first pace, wherein emphasizing each of the plurality of words comprises:
    - displaying an emphasized word from the first state to a second state successive to the first state when, based on the audio signals, the user is expected to speak the emphasized word, wherein the emphasized word is displayed as having the outline;
    - displaying the emphasized word from the second state to a third state successive to the second state when, based on the audio signals, the user is speaking the emphasized word, wherein the emphasized word is displayed as heavier-weighted text; and
    - displaying the emphasized word from the third state to a fourth state successive to the third state when, based on the audio signals, the user has completed speaking the emphasized word, wherein the emphasized word is displayed as plain regular text; wherein each of the plurality of words is visually emphasized one at a time such that a first word of the plurality of words is displayed in the third state when a second word of the plurality of words is displayed in the second state, when, based on the audio signals, the user is expected to speak the second word, and the first word of the plurality of words is displayed from the third state to the fourth state when the second word of the plurality of words is displayed from the second state to the third state when, based on the audio signals, the user is speaking the second word, and a third word of the plurality of words is displayed in the second state when, based on the audio signals, the user is expected to speak the third word.

15. The computing system of claim 14, wherein the instructions further cause the one or more processors to change a color of each of the plurality of words from at least one of the first state to the second state, the second state to the third state, and the third state to the fourth state.

16. The computing system of claim 14, wherein the instructions further cause the one or more processors to change a font of each of the plurality of words from at least one of the first state to the second state, the second state to the third state, and the third state to the fourth state.

17. The computing system of claim 14, wherein the instructions further cause the one or more processors to change an emphasis of each of the plurality of words from at least one of the first state to the second state, the second state to the third state, and the third state to the fourth state,
wherein the emphasis is at least one of bolding, underlining, shading, and cross-hatching.

18. The computing system of claim 14, wherein the instructions further cause the one or more processors to change an emphasis of each letter of each word of the plurality of words from at least one of the first state to the second state, the second state to the third state, and the third state to the fourth state.

19. The computing system of claim 18, wherein the emphasis is at least one of a size of each letter increasing then subsequently decreasing, a weight of each letter increasing then subsequently decreasing, a color of each letter brightening then subsequently darkening, changing a first color of each letter to a second color then subsequently reverting to the first color, and an outline of each letter appearing then subsequently disappearing.

20. The computing system of claim 14, wherein the instructions further cause the one or more processors to successively visually emphasize each of the plurality of words at a third pace corresponding to a rate at which a user's eye movements are tracked across a screen of a user computing device, wherein the screen displays the line of text having the plurality of words.

\* \* \* \* \*